(12) United States Patent
Kurosaki et al.

(10) Patent No.: US 9,741,152 B2
(45) Date of Patent: Aug. 22, 2017

(54) IMAGE PROCESSING APPARATUS, IMAGE PROCESSING METHOD, AND COMPUTER PROGRAM

(75) Inventors: Daisuke Kurosaki, Nagano (JP); Yasumasa Oda, Nagano (JP); Hanae Higuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 245 days.

(21) Appl. No.: 13/205,913

(22) Filed: Aug. 9, 2011

(65) Prior Publication Data
US 2012/0075290 A1    Mar. 29, 2012

(30) Foreign Application Priority Data

Sep. 29, 2010 (JP) .................... 2010-219867

(51) Int. Cl.
| | |
|---|---|
| *G06T 15/00* | (2011.01) |
| *G06T 15/10* | (2011.01) |
| *G06T 17/20* | (2006.01) |
| *G06T 15/20* | (2011.01) |
| *G06T 17/00* | (2006.01) |
| *H04N 13/00* | (2006.01) |

(Continued)

(52) U.S. Cl.
CPC ............. *G06T 15/00* (2013.01); *G06T 15/10* (2013.01); *G06T 15/20* (2013.01); *G06T 17/00* (2013.01); *G06T 17/20* (2013.01); *H04N 13/007* (2013.01); *H04N 13/026* (2013.01); *G06T 19/00* (2013.01)

(58) Field of Classification Search
CPC ......... G06T 15/20; G06T 19/00; G06T 15/10; G06T 17/20; G06T 17/00; G06K 15/02; H04N 1/6033
See application file for complete search history.

(56) References Cited

U.S. PATENT DOCUMENTS

| | | | |
|---|---|---|---|
| 6,686,926 B1 * | 2/2004 | Kaye ............................. | 345/680 |
| 2002/0118275 A1 * | 8/2002 | Harman ........................ | 348/51 |
| 2003/0214662 A1 * | 11/2003 | Mochizuki et al. ........... | 358/1.9 |

(Continued)

FOREIGN PATENT DOCUMENTS

JP    2010-210712    9/2010

OTHER PUBLICATIONS

Stereoscopic Image Generation Based on Depth Images for 3D TV: IEEE Transactions on Broadcasting vol. 51, No. 2,Jun. 2005, By: Zhang et al.*

(Continued)

*Primary Examiner* — Saptarshi Mazumder
(74) *Attorney, Agent, or Firm* — Chip Law Group

(57) ABSTRACT

An image processing apparatus includes a 3D image converter and a 3D image generator. The 3D image converter performs conversion processing for converting a 2D image including a plurality of planes that are created with virtual distances into a 3D image on the basis of the virtual distances among the plurality of planes of the 2D images. The 3D image generator generates a 3D image from the two-dimensional image on the basis of the conversion processing performed by the 3D image converter and displays the generated 3D image. When a virtual distance between the corresponding planes of the 2D image is changed while the 3D image is being displayed by use of the 3D image generator, the 3D image converter performs the conversion processing in accordance with a change in the virtual distance.

16 Claims, 26 Drawing Sheets

(51) Int. Cl.
*H04N 13/02* (2006.01)
*G06T 19/00* (2011.01)

(56) References Cited

U.S. PATENT DOCUMENTS

| | | | |
|---|---|---|---|
| 2004/0090523 A1* | 5/2004 | Kondo et al. | 348/46 |
| 2006/0066612 A1* | 3/2006 | Yang | G06T 15/205 |
| | | | 345/419 |
| 2007/0236475 A1* | 10/2007 | Wherry | 345/173 |
| 2009/0317061 A1* | 12/2009 | Jung et al. | 386/95 |
| 2010/0050133 A1* | 2/2010 | Nishihara et al. | 715/863 |
| 2010/0225750 A1 | 9/2010 | Nakahata et al. | |
| 2011/0107216 A1* | 5/2011 | Bi | 715/716 |
| 2011/0188780 A1* | 8/2011 | Wang et al. | 382/293 |

OTHER PUBLICATIONS

Stereoscopic Image Generation Based on Depth Images for 3D TV, IEEE Transactions on Broadcasting, vol. 51, No. 2, Jun. 2005.*
"Image-based modeling and photo editing." Proceedings of the 28th annual conference on Computer graphics and interactive techniques. ACM, 2001, by Oh et al.*
De Silva et al., "Just noticeable difference in depth model for stereoscopic 3D displays. In Multimedia and Expo (ICME), 2010 IEEE International Conference on Jul. 19, 2010 (pp. 1219-1224). IEEE".*

* cited by examiner

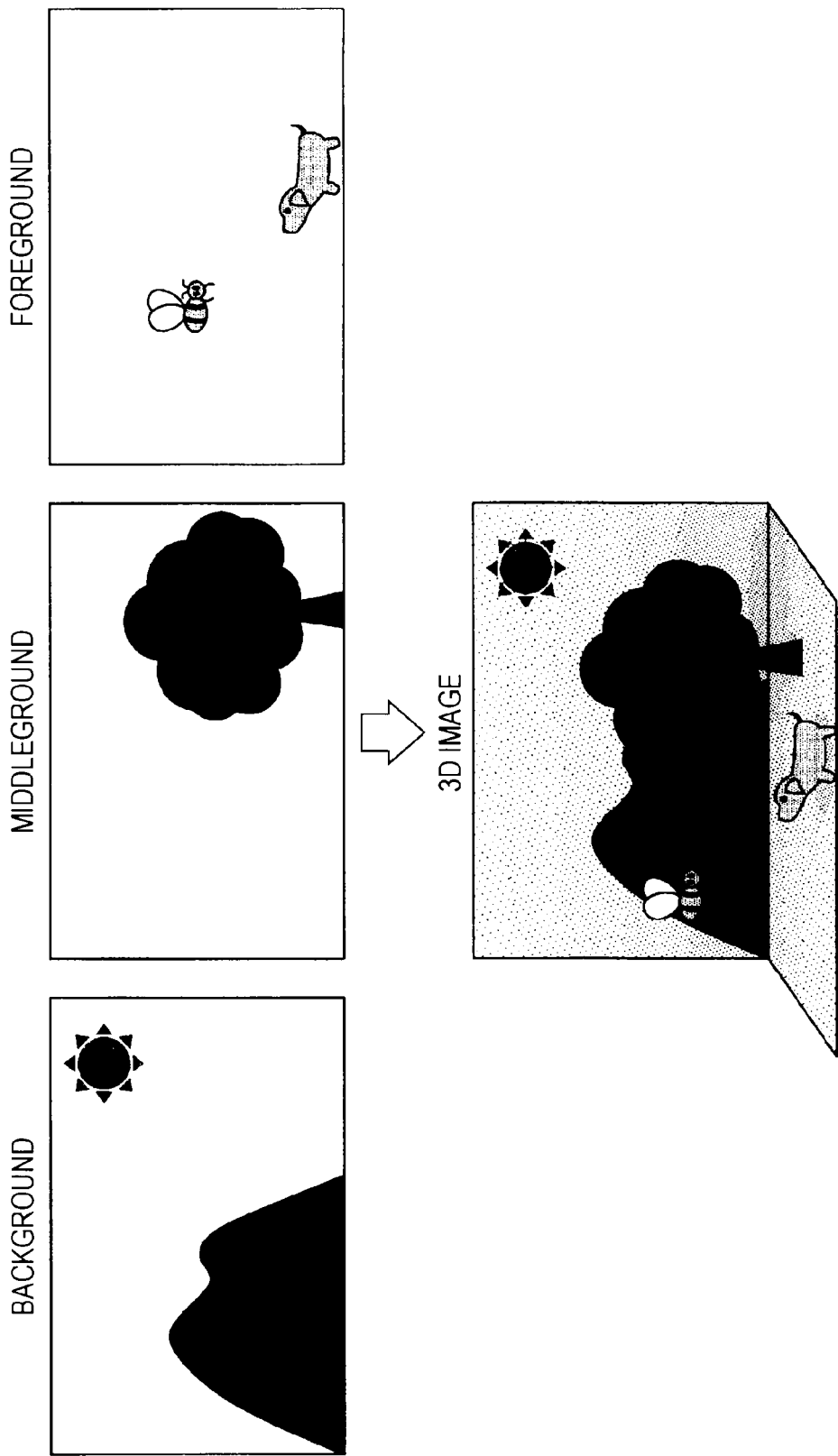

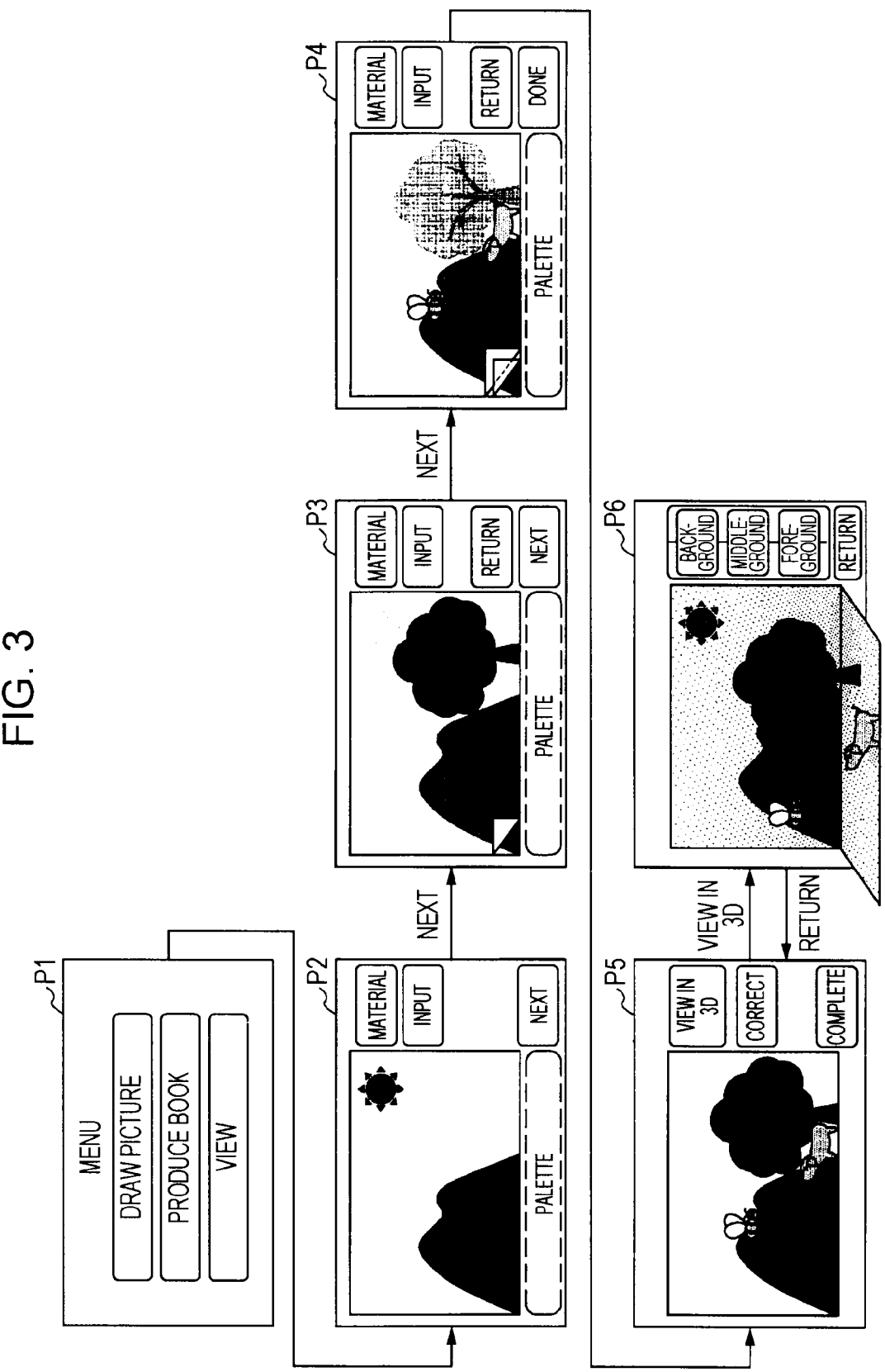

FIG. 4C
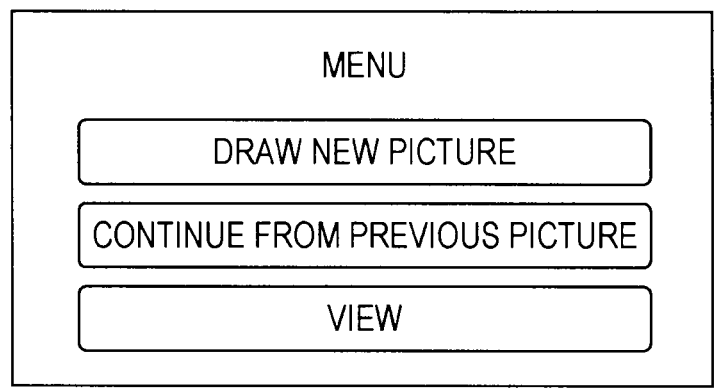
↓ DRAW NEW PICTURE
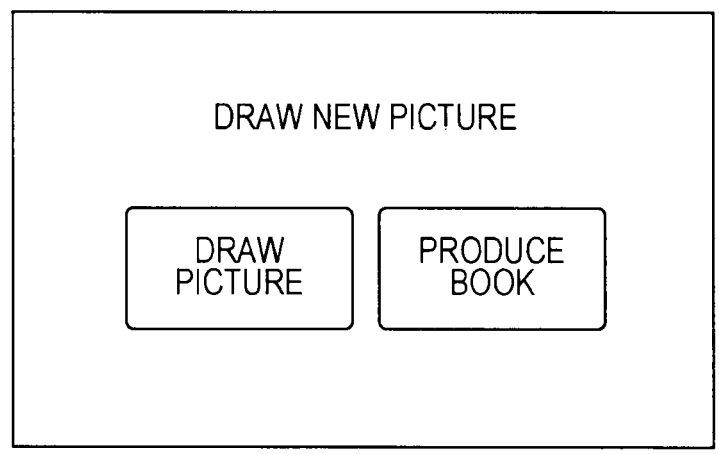
↓ DRAW PICTURE
TO DRAW SCREEN

FIG. 14
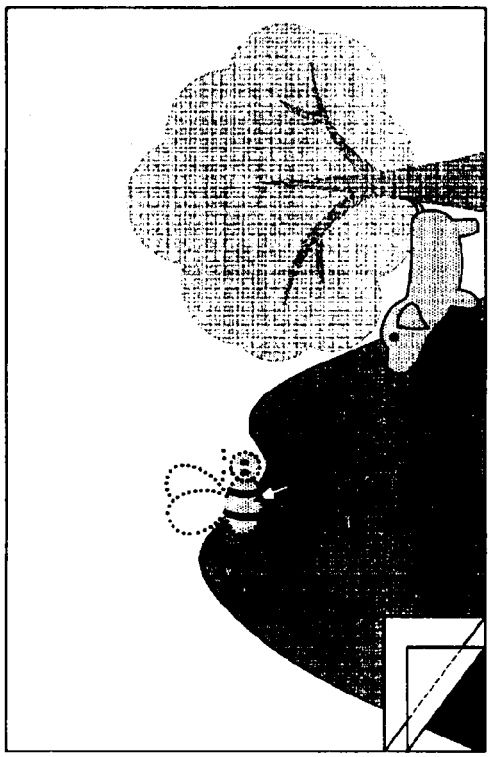
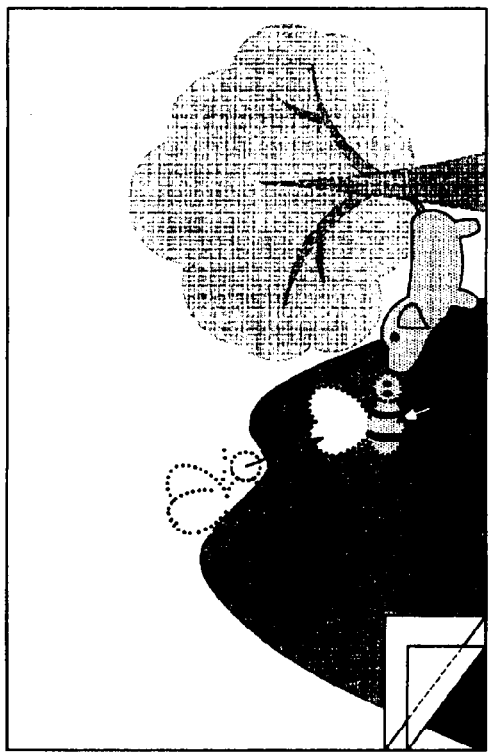

FIG. 15
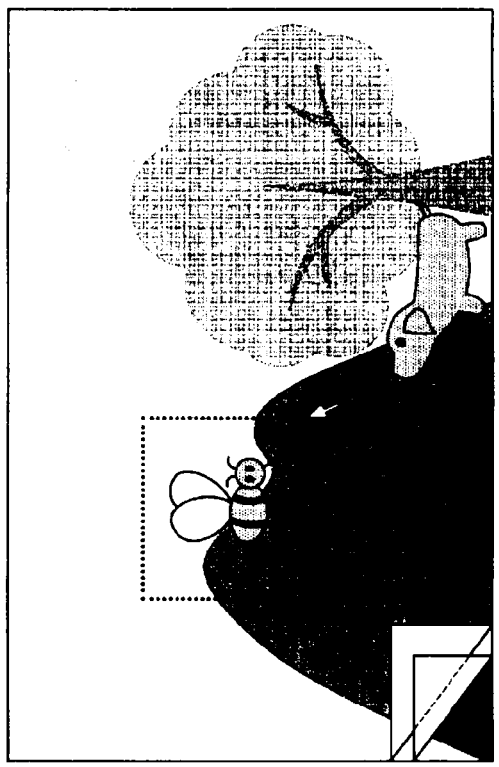
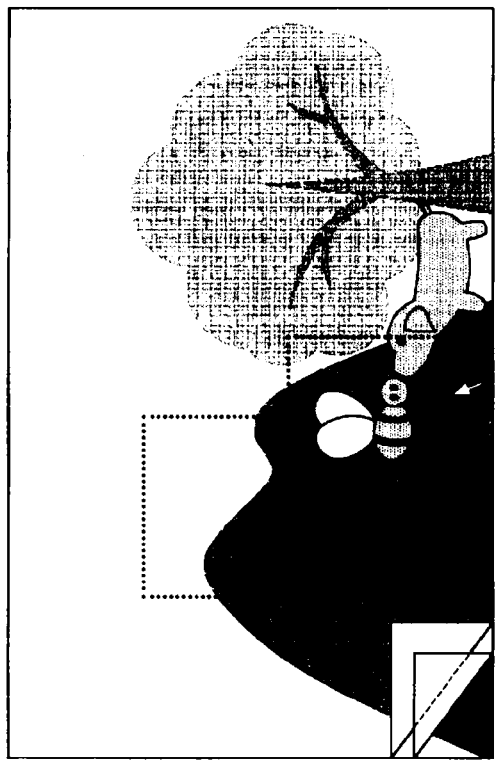

IMAGE PROCESSING APPARATUS, IMAGE PROCESSING METHOD, AND COMPUTER PROGRAM

BACKGROUND

The present disclosure relates to image processing apparatuses, image processing methods, and computer programs.

Recently, video display apparatuses for displaying images (three-dimensional (3D) images) that allow users to perceive images three-dimensionally have been released and are coming into widespread use (for example, see Japanese Unexamined Patent Application Publication No. 2010-210712). Apparatuses configured to display 3D images are not restricted to television receivers and video display apparatuses. Some personal computers are also able to display 3D images.

Among applications operating on a personal computer, some applications enable a user to generate content including 3D images. By use of such an application, the user is able to generate content and views the content with a predetermined method so as to perceive images included in the content as 3D images.

SUMMARY

However, according to the related art, dedicated software is necessary for setting positional relationships in order to create content including 3D images. It is thus very difficult for end users to create such content.

It is thus desirable to provide a novel and improved image processing apparatus, image processing method, and computer program that facilitate the creation of content including 3D images.

According to an embodiment of the present disclosure, there is provided an image processing apparatus including a 3D image converter configured to perform conversion processing for converting a 2D image including a plurality of planes that are created with virtual distances into a 3D image on the basis of the virtual distances among the plurality of planes of the 2D images; and a 3D image generator configured to generate a 3D image from the 2D image on the basis of the conversion processing performed by the 3D image converter and configured to display the generated 3D image. When a virtual distance between the corresponding planes of the 2D image is changed while the 3D image is being displayed by use of the 3D image generator, the 3D image converter performs the conversion processing in accordance with a change in the virtual distance.

The 3D image converter may perform the conversion processing for converting a ground portion of the 2D image into a 3D image on the basis of a horizon which is set in at least one of the plurality of planes of the 2D image.

The 3D image converter may perform the conversion processing so that spaces are not generated at edge portions of a 3D image when converting the 2D image into a 3D image.

The 3D image converter may perform the conversion processing so that edge portions of the 2D image are not missing on a 3D image when converting the 2D image into the 3D image.

The virtual distance between the corresponding planes of the 2D image may be changed by the 3D image converter by use of a slider bar which is displayed on a screen in association with the 2D image.

The virtual distance between the corresponding planes of the 2D image may be changed by the 3D image converter by use of wheels which are displayed on a screen in association with the corresponding planes of the 2D image.

The image processing apparatus may further include an imaging device configured to capture an image. The 3D image converter may detect a gesture performed by a user toward the imaging device, the gesture being captured by the imaging device, so as to change the virtual distance between the corresponding planes of the 2D image in accordance with the gesture.

By use of the gesture, the user may specify a plane of the 2D image with an appropriate number of fingers and changes the virtual distance between the corresponding planes of the 2D image with a back-and-forth movement of the finger.

According to another embodiment of the present disclosure, there is provided an image processing method including: performing conversion processing for converting a 2D image including a plurality of planes that are created with virtual distances into a 3D image on the basis of the virtual distances among the plurality of planes of the 2D images; and generating a 3D image from the 2D image on the basis of the conversion processing so as to display the generated 3D image. When a virtual distance between the corresponding planes of the 2D image is changed while the 3D image is being displayed, the conversion processing may be performed in accordance with a change in the virtual distance.

According to still another embodiment of the present disclosure, there is provided a computer program that allows a computer to execute: performing conversion processing for converting a 2D image including a plurality of planes that are created with virtual distances into a 3D image on the basis of the virtual distances among the plurality of planes of the 2D images; and generating a 3D image from the 2D image on the basis of the conversion processing so as to display the generated 3D image, wherein, when a virtual distance between the corresponding planes of the 2D image is changed while the 3D image is being displayed, the conversion processing is performed in accordance with a change in the virtual distance.

As described above, according to an embodiment of the present disclosure, it is possible to provide a novel and improved image processing apparatus, image processing method, and computer program that facilitate the creation of content including 3D images.

BRIEF DESCRIPTION OF THE DRAWINGS

FIG. 2 illustrates an overview of the generation of a 3D image performed by the image processing apparatus according to an embodiment of the present disclosure;

FIG. 3 illustrates an example of the generation of a 3D image performed by the image processing apparatus according to an embodiment of the present disclosure;

FIGS. 4A through 4C illustrate examples of menu screens to be displayed on an image display unit;

FIG. 14 illustrates a technique for moving an object contained in an image drawn by a user by use of the image processing apparatus according to an embodiment of the present disclosure;

FIG. 15 illustrates a technique for moving an object contained in an image drawn by a user by use of the image processing apparatus according to an embodiment of the present disclosure;

DETAILED DESCRIPTION OF EMBODIMENTS

Figure 1:
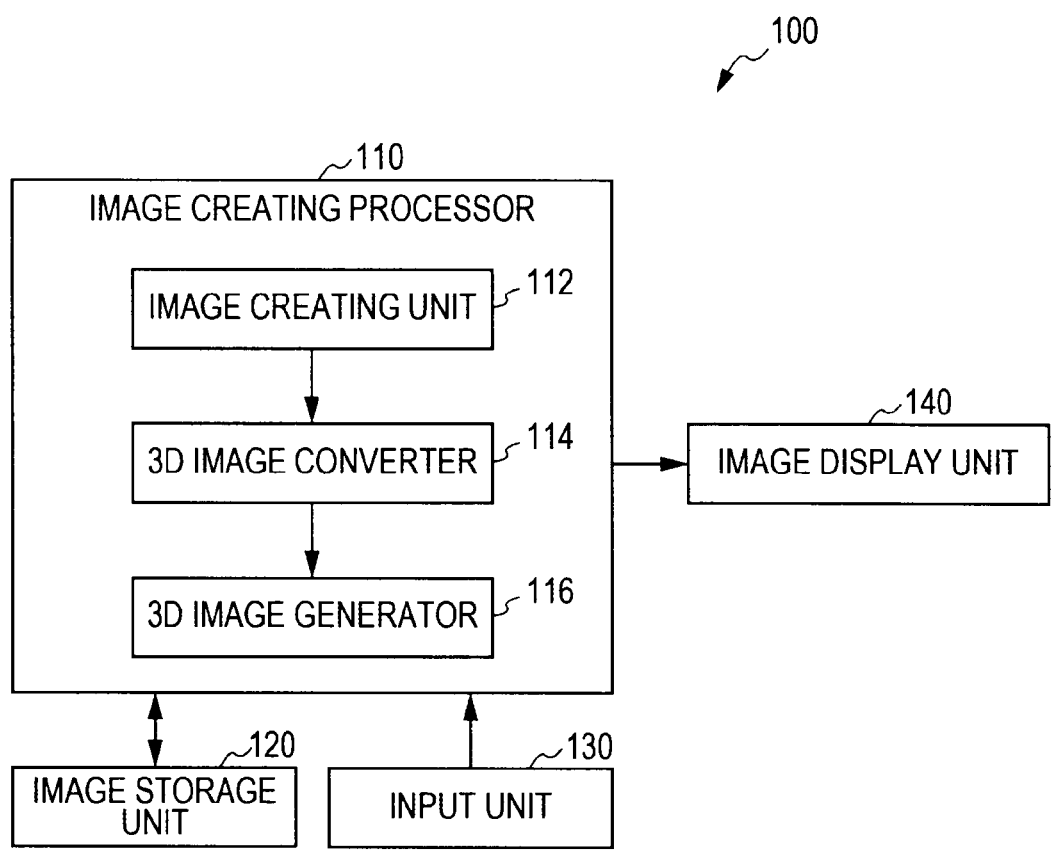
FIG. 1 illustrates the functional configuration of an image processing apparatus according to an embodiment of the present disclosure.

An embodiment of the present disclosure will be described in detail below with reference to the accompanying drawings. In this specification and drawings, elements having substantially the same functional configurations are designated by like reference numerals, and an explanation thereof will be given only once.

A description will be given in the following order.
1. Embodiment of the Present Disclosure
1-1. Functional Configuration of Image Processing Apparatus
1-2. Overview of Generation of 3D Images
1-3. Examples of Generation of 3D Images
1-4. Examples of Interfaces for Adjusting Depths
1-5. Examples of Setting of Ground in 3D Image
2. Hardware Configuration
3. Summary 1. Embodiment of the Present Disclosure 1-1. Functional Configuration of Image Processing Apparatus The functional configuration of an image processing apparatus 100 according to an embodiment of the present disclosure will first be described below with reference to FIG. 1.

The image processing apparatus 100 shown in FIG. 1 is configured to allow a user to create images and to display them. The image processing apparatus 100 includes, as shown in FIG. 1, an image creating processor 110, an image storage unit 120, an input unit 130, and an image display unit 140.

The image creating processor 110 is configured to present an image creating screen to a user through use of the image display unit 140 and to generate 3D images from images created by the user. The image creating processor 110 of the image processing apparatus 100 includes, as shown in FIG. 1, an image creating unit 112, a 3D image converter 114, and a 3D image generator 116.

In this embodiment, when the user generates a plurality of images (e.g., three images) by use of the image creating screen, the image creating processor 110 generates a 3D image from the images created by the user. In the image processing apparatus 100 of this embodiment, a 3D image generated by the image creating processor 110 is displayed on the image display unit 140 according to a predetermined method, and the user views the 3D image according to a predetermined method (e.g., by wearing shutter glasses that are operated in the time division drive system), thereby enabling the user to perceive the 3D image displayed on the image display unit 140 three-dimensionally.

The image creating unit 112 is configured to present the image creating screen to the user through use of the image display unit 140 so as to allow the user to generate images. When the user creates an image including a plurality of layers by using the image creating screen presented by the image creating unit 112, the image having the plurality of layers is converted into a 3D image by the 3D image converter 114 and the 3D image generator 116. The image including the plurality of layers created by use of the image creating unit 112 is also stored in the image storage unit 120 in response to an operation performed by the user.

The 3D image converter 114 performs conversion processing for converting an image including a plurality of layers supplied from the image creating unit 112 into a 3D image. The generated 3D image is to be displayed on the image display unit 140. In the conversion processing, the image processing apparatus 100 of this embodiment assumes the inter-eye distance of the user and the distance between the user and the display unit, and performs conversion processing for converting the image including the plurality of layers to a 3D image on the basis of the virtual distances among the layers (information concerning the layer depths of the image) and for displaying the converted 3D image on the image display unit 140. More specifically, the 3D image converter 114 performs coordinate transform processing on the image including the plurality of layers so as to generate a 3D image. Details of the conversion processing will be discussed later.

As discussed above, the 3D image converter 114 performs conversion processing for converting a two-dimensional (2D) image including a plurality of layers into a 3D image and for displaying the 3D image on the image display unit 140. In this embodiment, during this conversion processing, while the 3D image is being displayed on the image display unit 140, the user adjusts the layer depths of the image so as to change the depth of the 3D image, and then, the 3D image converter 114 performs conversion processing in real time in accordance with the adjustment made by the user. With this processing, after adjusting the layer depths of the image, the user can check the adjusted 3D image in real time.

When creating a 3D image from a 2D image including a plurality of layers generated by a user, the image processing apparatus 100 of this embodiment displays a preview of the 3D image. This enables the user to check how the created image appears as a 3D image before storing the 3D image.

The 3D image generator 116 is configured to generate a 3D image from an image including a plurality of layers on the basis of the conversion processing performed by the 3D image converter 114. The 3D image generated by the 3D image generator 116 is displayed on the image display unit 140, and is also stored in the image storage unit 120 in response to an operation performed on the input unit 130 by the user.

The image storage unit 120 is configured to store therein images including a plurality of layers created by the image creating unit 112 and 3D images generated from images including a plurality of layers by the 3D image converter 114 and the 3D image generator 116. The images stored in the image storage unit 120 are read out from the image storage unit 120 in accordance with an operation performed on the input unit 130 by the user. The read images are then subjected to image processing in the image creating processor 110 or displayed on the image display unit 140.

The input unit 130 includes various input devices for allowing a user to perform input operations on the image processing apparatus 100, and includes, for example, a keyboard, a mouse, a graphics tablet, and a touch panel. By operating the input unit 130, the user is able to create an image including a plurality of layers or to adjust the layer depths of the image when converting the image into a 3D image.

The image display unit 140 is configured to display images, for example, images including a plurality of layers created by the image creating processor 110 and 3D images generated from images including a plurality of layers. The image display unit 140 displays a screen for allowing the user to create those images.

In this embodiment, the image display unit 140 may be a display device that enables the display of 3D images. A display technique for 3D images is not particularly restricted. As an example of the display technique, right-eye images and left-eye images are displayed such that they are alternately switched at high speed. As a transmitting technique for 3D images to the image display unit 140, frame sequential, side by side, top and bottom formats may be used.

In an embodiment of the present disclosure, images created in the image creating processor 110 may be output to a television receiver or another display device that is connected to the image processing apparatus 100 and that is configured to display 3D images.

The functional configuration of the image processing apparatus 100 has been described above with reference to FIG. 1. A description will now be given of an overview of the generation of 3D images by use of the image processing apparatus 100 according to an embodiment of the present disclosure.

1-2. Overview of Generation of 3D Images

FIG. 2 illustrates an overview of the generation of a 3D image performed by the image processing apparatus 100 according to an embodiment of the present disclosure.

The image processing apparatus 100 allows a user to create an image including three layers, i.e., a background, a middleground, and a foreground, as shown in FIG. 2. The image including the three layers is converted into a 3D image by use of the 3D image converter 114 so that the user can perceive the image three-dimensionally. It is thus possible to generate 3D images without the need for the user to perform complicated image processing.

The overview of the generation of a 3D image according to an embodiment of the present disclosure has been described above. A description will now be given of an example of the generation of a 3D image performed by the image processing apparatus 100 according to an embodiment of the present disclosure.

1-3. Examples of Generation of 3D Images

FIG. 3 illustrates an example of the generation of a 3D image performed by the image processing apparatus 100 according to an embodiment of the present disclosure.

P1 through P6 shown in FIG. 3 designate examples of images to be displayed on the image display unit 140 by use of the image creating processor 110.

The image designated by P1 is an example of a menu screen. While the image designated by P1 is being displayed on the image display unit 140 by the image creating processor 110, the user selects a "DRAW PICTURE" button by use of the input unit 130. Then, the image creating processor 110 displays the image designated by P2 on the image display unit 140.

The image designated by P2 is an example of the image creating screen for allowing the user to create an image. The image creating screen designated by P2 is a screen for allowing the user to create a background image. The user can draw a background image on the image creating screen by operating the input unit 130. While the image designated by P2 is being displayed on the image display unit 140 by the image creating processor 110, the user selects a "NEXT" button. Then, the image creating processor 110 displays the image designated by P3 on the image display unit 140.

The image designated by P3 is an example of the image creating screen for allowing the user to create an image. The image creating screen designated by P3 is a screen for allowing the user to create a middleground image by operating the input unit 130. In the state in which the screen for allowing the user to create a middleground image is being displayed on the image display unit 140, the background image created by the user on the image display screen designated by P2 is also displayed on the image display unit 140.

While the image designated by P3 is being displayed on the image display unit 140 by the image creating processor 110, the user selects a "NEXT" button by use of the input unit 130. Then, the image creating processor 110 displays the image designated by P4 on the image display unit 140.

The image designated by P4 is an example of the image creating screen for allowing the user to create an image. The image designated by P4 is a screen for allowing the user to create a foreground image by operating the input unit 130. In the state in which the screen for allowing the user to create a foreground image is being displayed on the image display unit 140, the background image and the middleground image created by the user on the image display screens designated by P2 and P3, respectively, are also displayed on the image display unit 140.

While the image designated by P4 is being displayed on the image display unit 140 by the image creating processor 110, the user selects a "DONE" button by use of the input unit 130. Then, the image creating processor 110 displays the image designated by P5 on the image display unit 140.

When creating the above-described background, middleground, foreground images, a template may be provided to allow the user to select materials from the template. If the image processing apparatus 100 is provided with an imaging device (web camera), it may use images captured by the imaging device as background, middleground, and foreground images.

The image designated by P5 is an example of a screen for displaying images created by the user. The image creating unit 112 presents the screen designated by P5 on the image display unit 140 so that the user can check the created images.

While the image designated by P5 is being displayed on the image display unit 140 by the image creating processor 110, the user selects a "VIEW IN 3D" button by use of the input unit 130. Then, the image creating processor 110 displays the image designated by P6 on the image display unit 140.

The image designated by P6 is an example of the screen for displaying images created by the user. The image designated by P6 is a screen for displaying a preview of a 3D image converted from an image including a plurality of layers created by the user. In this case, a 3D image is presented such that the image of a mountain created as the background image is seen in the backward, the image of a tree created as the middleground image is seen in the middle portion, and the images of a bee and a dog created as the foreground image are seen in the forward. In this manner, the image creating processor 112 presents the screen designated by P6 on the image display unit 140, thereby enabling the user to check a 3D image generated from the images created by the user.

A slider bar for adjusting the appearance of 3D images is displayed on the screen designated by P6. When the user operates this slider bar by use of the input unit 130, the 3D image converter 114 adjusts the appearance of a 3D image and converts the images created by the user into a 3D image. When the user operates this slider bar by use of the input unit 130, the 3D image converter 114 adjusts the appearance of the 3D image without any delay. Accordingly, when the user operates the slider bar by use of the input unit 130, the appearance of a 3D image which is preview-displayed on the image display unit 140 is changed in real time.

The images created by the user as described above can be stored in the image storage unit 120. In this case, images may be stored in various data formats. For example, each layer may be stored as an independent image so that it can be re-edited. Alternatively, images may be stored in a data format (e.g., JPEG) such that all layers are stored as one image. Alternatively, images may be stored in a multi-picture object file (MPO) format.

An example of the generation of a 3D image performed by the image processing apparatus 100 according to an embodiment of the present disclosure has been discussed above. A description will now be given of examples of menu screens displayed on the image display unit 140 when generating a 3D image by use of the image processing apparatus 100.

Figure 4A:
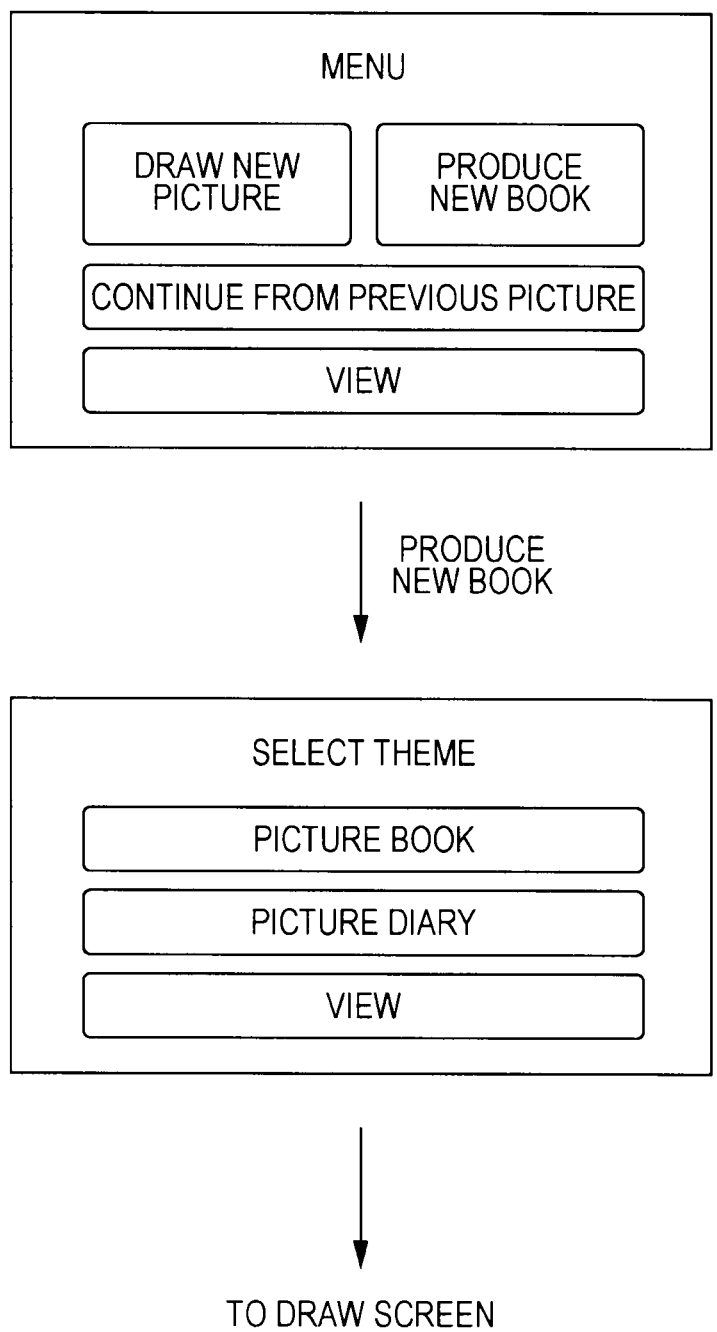
Figure 4B:
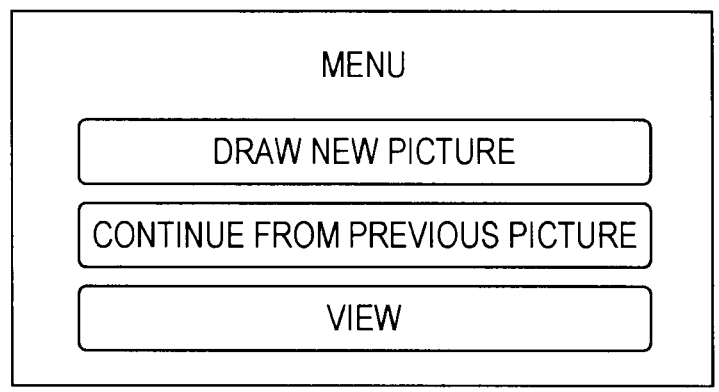

FIGS. 4A through 4C illustrate examples of menu screens to be displayed on the image display unit 140 when generating 3D images by use of the image processing apparatus 100 according to an embodiment of the present disclosure.

FIG. 4A illustrates examples of menu screens to be displayed on the image display unit 140 when generating 3D images by use of the image processing apparatus 100. In FIG. 4A, a menu including menu items "DRAW NEW PICTURE", "PRODUCE NEW BOOK", "CONTINUE FROM PREVIOUS PICTURE", and "VIEW" is displayed. If the user selects "PRODUCE NEW BOOK", a "SELECT THEME" menu is displayed, and menu items "PICTURE BOOK", "PICTURE DIARY", and "VIEW" are displayed. If the user selects "PICTURE BOOK" or "PICTURE DIARY", a draw screen for creating images is displayed on the image display unit 140.

FIG. 4B illustrates other examples of menu screens to be displayed on the image display unit 140 when generating 3D images by use of the image processing apparatus 100 according to an embodiment of the present disclosure. In FIG. 4B, a menu including menu items "DRAW NEW PICTURE" "CONTINUE FROM PREVIOUS PICTURE", and "VIEW" is displayed. If the user selects "DRAW NEW PICTURE", a draw screen for creating images is displayed on the image display unit 140. Upon completion of drawing one page of image, a menu screen for creating another image is displayed on the image display unit 140. On the menu screen, menu items "FINISH" and "DRAW NEXT PAGE" are displayed. If the user selects "DRAW NEXT PAGE", the draw screen for creating an image is displayed again. If the user selects "FINISH", the image processing apparatus 100 finishes creating images.

FIG. 4C illustrates other examples of menu screens to be displayed on the image display unit 140 when generating 3D images by use of the image processing apparatus 100 according to an embodiment of the present disclosure. In FIG. 4C, a menu including menu items "DRAW NEW PICTURE" "CONTINUE FROM PREVIOUS PICTURE", and "VIEW" is displayed. If the user selects "DRAW NEW PICTURE", a "DRAW NEW PICTURE" screen is displayed on the image display unit 140, and on the menu screen, menu items "DRAW PICTURE" and "PRODUCE BOOK" are displayed. If the user selects "DRAW PICTURE", a draw screen for creating an image is displayed on the image display unit 140.

The generation of 3D images performed by the image processing apparatus 100 according to an embodiment of the present disclosure has been discussed through illustration of examples of menu screens displayed on the image display unit 140. A description will now be given of examples of user interfaces for allowing a user to adjust the appearance of 3D images.

Figure 5A:
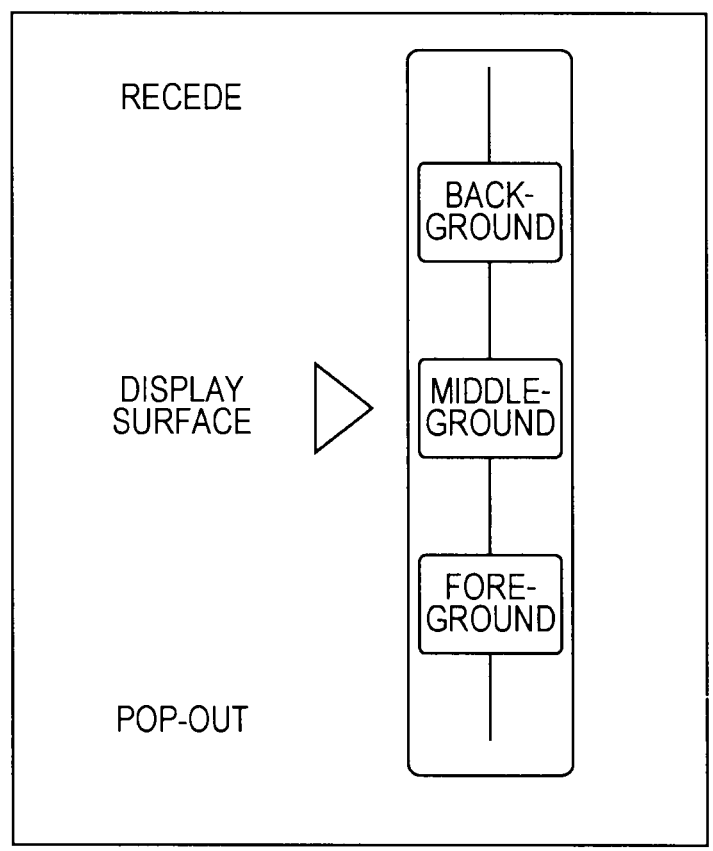
FIGS. 5A and 5B illustrate examples of slider bars for adjusting the appearance of 3D images.
Figure 5B:
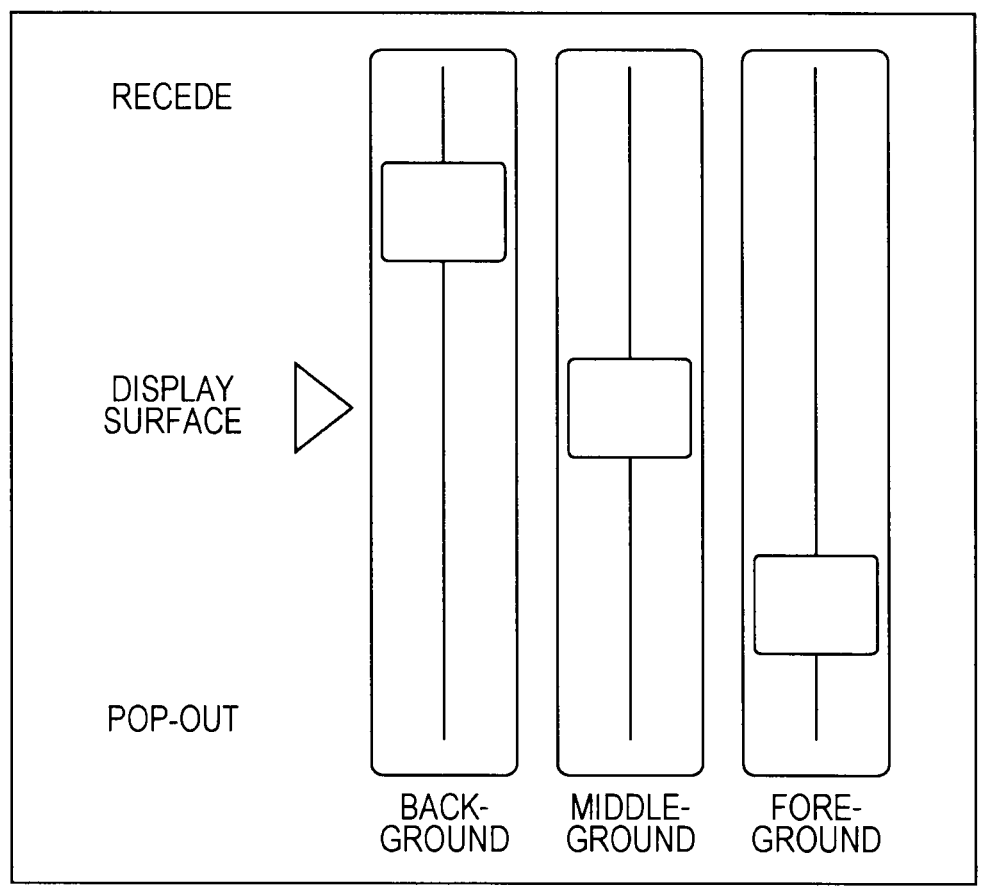

FIGS. 5A and 5B illustrate examples of slider bars for adjusting the appearance of 3D images. The slider bar shown in FIG. 5A is an example in which one slider bar can be used to adjust all individual layers. In contrast, the slider bars shown in FIG. 5B are an example in which one slider bar adjusts a corresponding layer. In FIGS. 5A and 5B, for the sake of representation, preview-display of a 3D image is not shown, it is desirable, however, that a preview of a 3D image be displayed together with the user interface, such as that shown in FIG. 5A or 5B.

On the slider bar shown in FIG. 5A or 5B, a mark indicating the position of the display screen is also displayed. When the user operates the slider bar, the 3D image converter 114 changes the virtual depth of the corresponding layer in accordance with the operation performed on the slider bar, thereby performing coordinate transform processing.

Such a slider bar is displayed on the image display unit 140 so that the user adjusts the appearance of each layer of a 3D image, and accordingly, the 3D image converter 114 can adjust the appearance of the 3D image without any delay so as to convert an image drawn by the user into a 3D image. The operation of the slider bar may be restricted so that the foreground layer is prevented from going beyond the background layer. Alternatively, the foreground layer may go beyond the background layer without any restriction.

Examples of user interfaces for allowing the user to adjust the appearance of a 3D image have been discussed above. A detailed description will now be given of 3D image conversion processing performed by the 3D image converter 114 according to an embodiment of the present disclosure.

Figure 6:
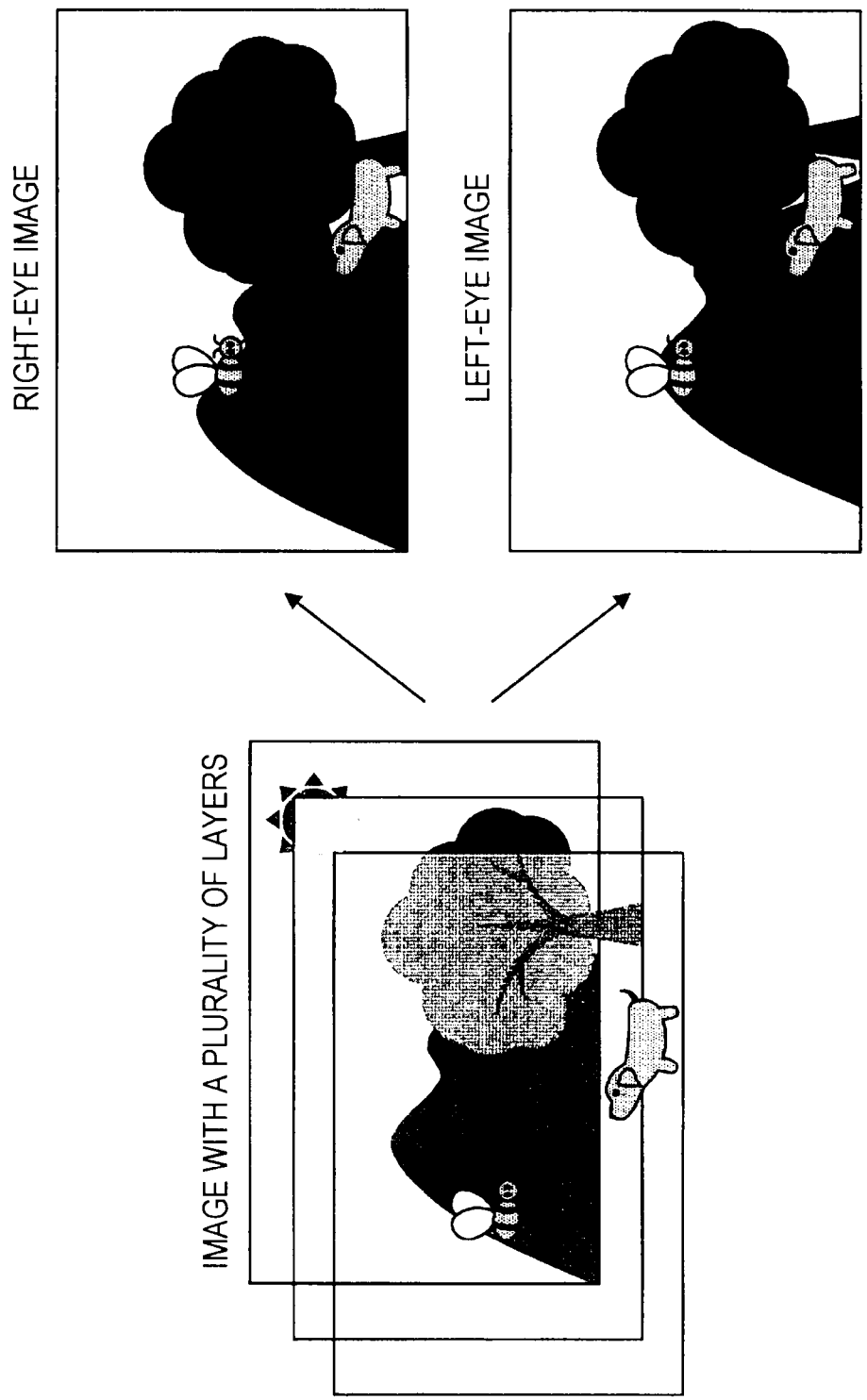
FIG. 6 conceptually illustrates conversion from a 2D image including a plurality of layers into a 3D image.

FIG. 6 conceptually illustrates conversion from a regular 2D image including a plurality of layers into a 3D image. FIG. 6 illustrates conversion from a 2D image into a right-eye image to be viewed with a right eye and a left-eye image to be viewed with a left eye. In order to convert the 2D image into the right-eye image and the left-eye image, the 3D image converter 114 calculates rendering positions of the right-eye image and the left-eye image.

An example of a specific calculation method for rendering positions of a right-eye image and a left-eye image will be described below.

Figure 7A:
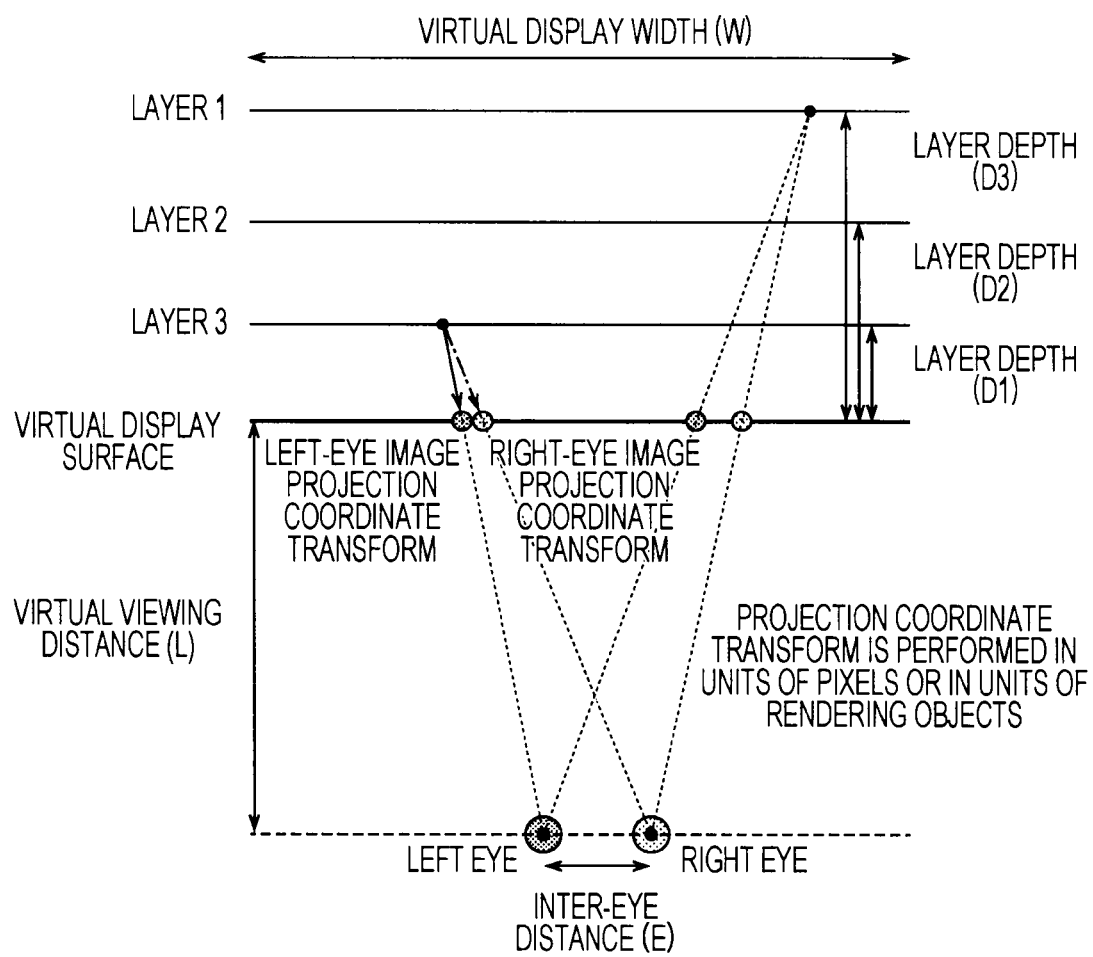
FIGS. 7A through 7C illustrate examples of conversion from a regular 2D image including a plurality of layers into a 3D image.
Figure 7B:
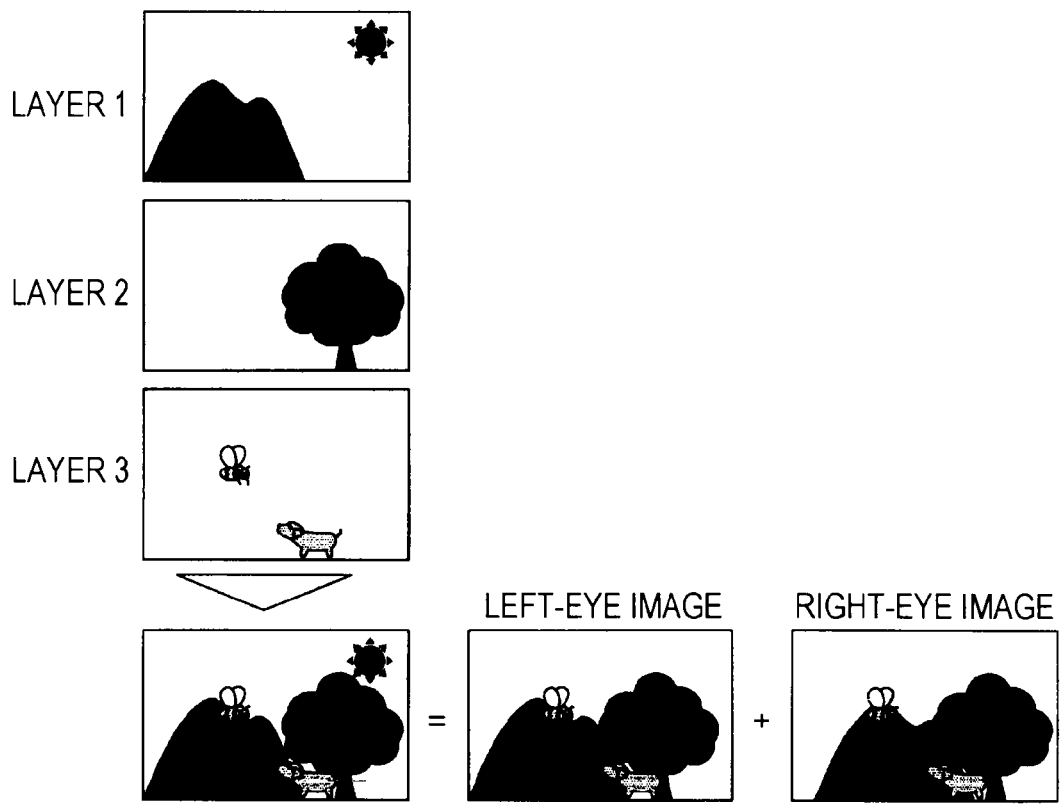
Figure 7C:
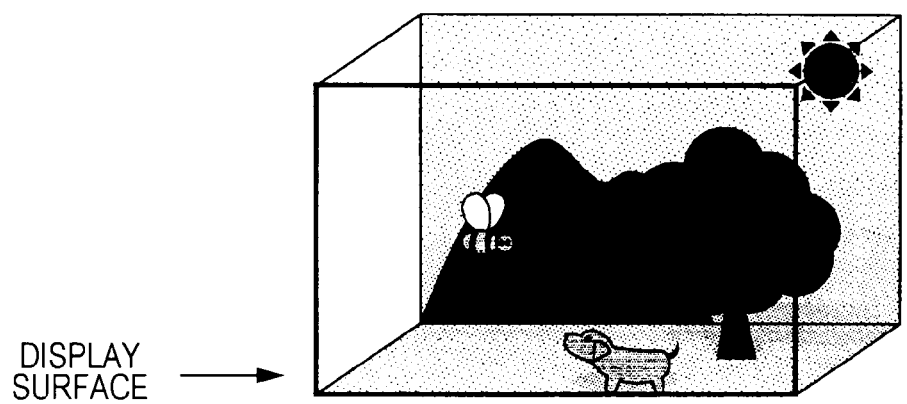

FIGS. 7A through 7C illustrate examples of conversion from a regular 2D image into a 3D image. FIG. 7A illustrates coordinate transform for generating a right-eye image and a left-eye image from a 2D image including three layers, such as that shown in FIG. 7B. The coordinate transform shown in FIG. 7A is performed such that the three layers are seen farther backward than the display surface, as shown in FIG. 7C. FIG. 7A schematically illustrates the individual layers and the display surface as viewed from the top.

By assuming the inter-eye distance E between the right eye and the left eye and the virtual viewing distance L, the 3D image converter 114 performs, as shown in FIG. 7A, projection coordinate transform for the right-eye image and projection coordinate transform for the left-eye image with use of the layer depths D1, D2, and D3 between the display surface and the layer 3, layer 2, and layer 1, respectively.

In this manner, the 3D image converter 114 performs projection coordinate transform onto the display surface. Accordingly, the image processing apparatus 100 of this embodiment is able to convert a regular 2D image including a plurality of layers into a 3D image.

Figure 8A:
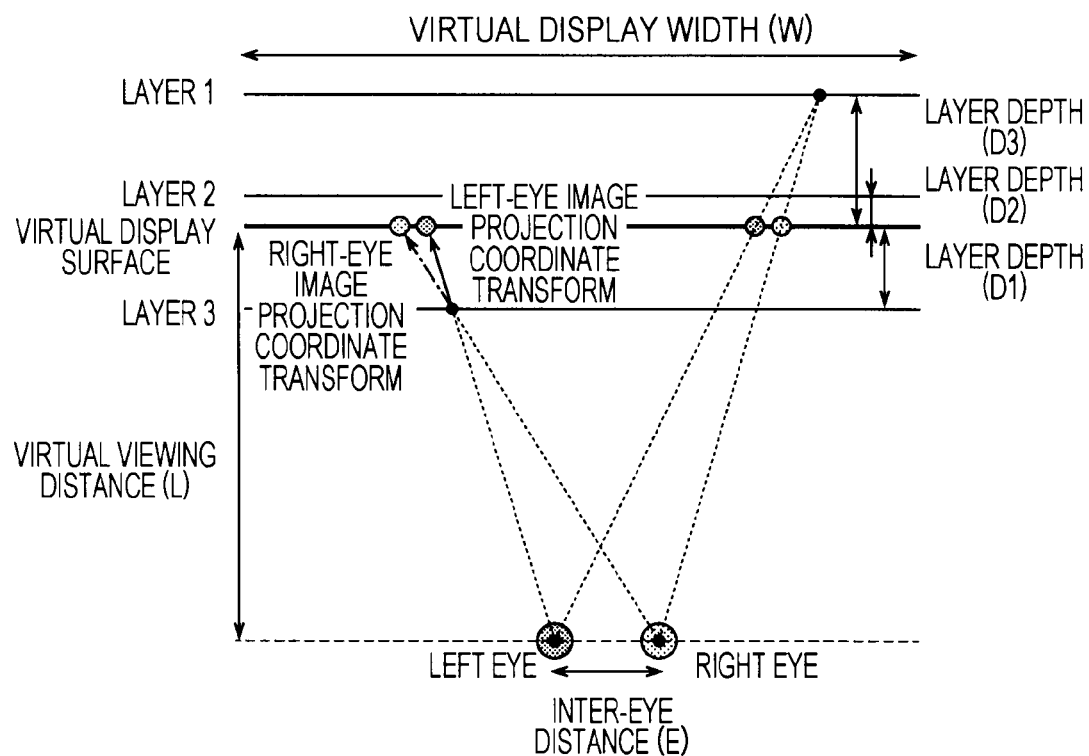
FIGS. 8A and 8B illustrate examples of conversion from a regular 2D image including a plurality of layers into a 3D image.
Figure 8B:
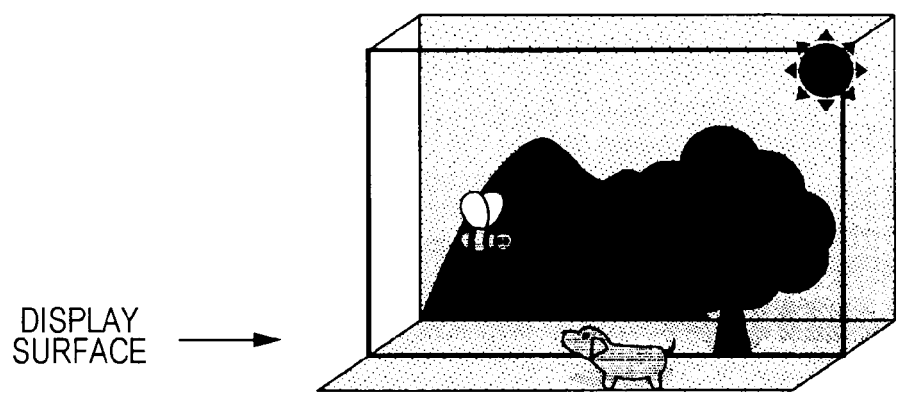

FIGS. 8A and 8B illustrate an example of conversion from a regular 2D image including a plurality of layers into a 3D image. FIG. 8A illustrates coordinate transform from a 2D image including three layers, such as that shown in FIG. 8A, into a right-eye image and a left-eye image. The coordinate transform shown in FIG. 8A is performed such that a certain layer pops out farther forward than the display surface, as shown in FIG. 8B. FIG. 8A schematically illustrates the individual layers and the display surface as viewed from the top.

In this manner, the 3D image converter 114 performs coordinate transform. Thus, the image processing apparatus 100 of this embodiment is able to transform a regular 2D image including a plurality of layers into a 3D image even when a certain layer pops out farther forward than the display surface.

3D conversion processing performed by the 3D image converter 114 has been discussed above. A description will now be given of problems occurring when a regular 2D image is converted into a 3D image and solutions to such problems.

Figure 9:
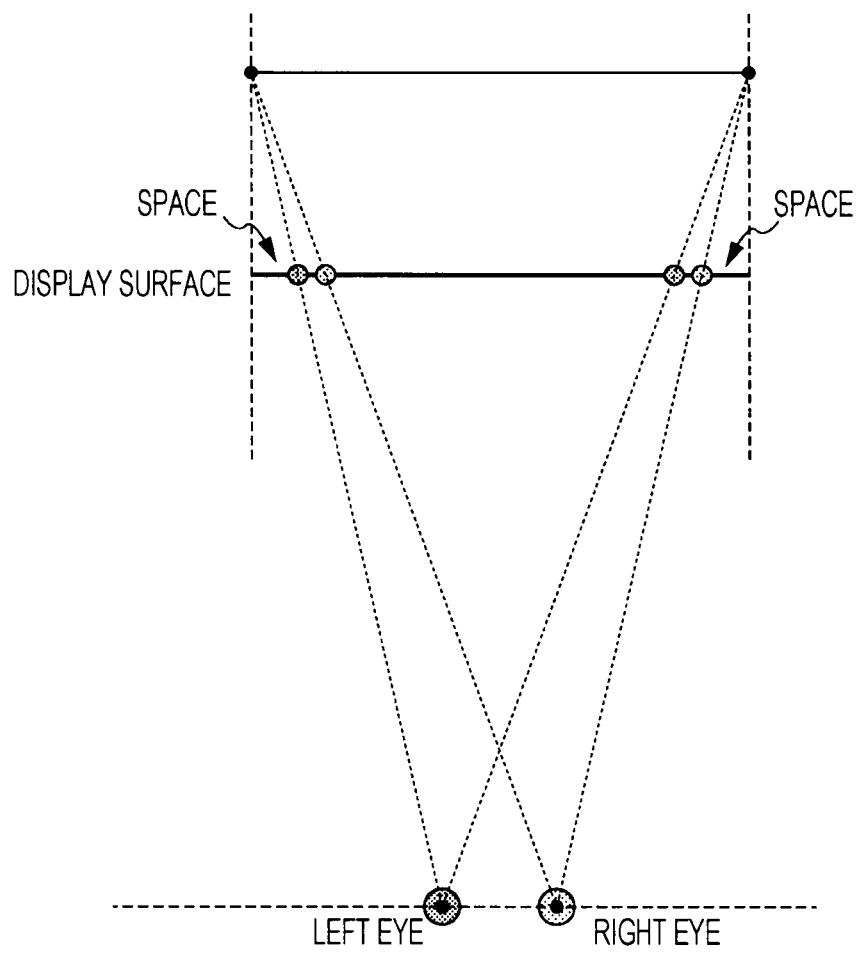
FIG. 9 illustrates a state in which spaces are generated at the edge portions of an output image when a layer disposed farther backward than a display surface is projected on the output image.

It is now assumed that the resolution (canvas resolution) used when creating an image and the output resolution of the image be set to be the same resolution. In this case, if a layer positioned farther backward than the display surface is projected on the output image (display surface), spaces are generated at the edge portions of the output image. FIG. 9 schematically illustrates the layers and the display surface as viewed from the top in such a state.

As solutions to the generation of spaces, when converting a 2D image into a 3D image, the spaces may be filled with a background color. The background color may be selected by the user. Alternatively, the color which is mostly used in that layer may be automatically selected, or the color used around the layer may be selected.

Figure 10:
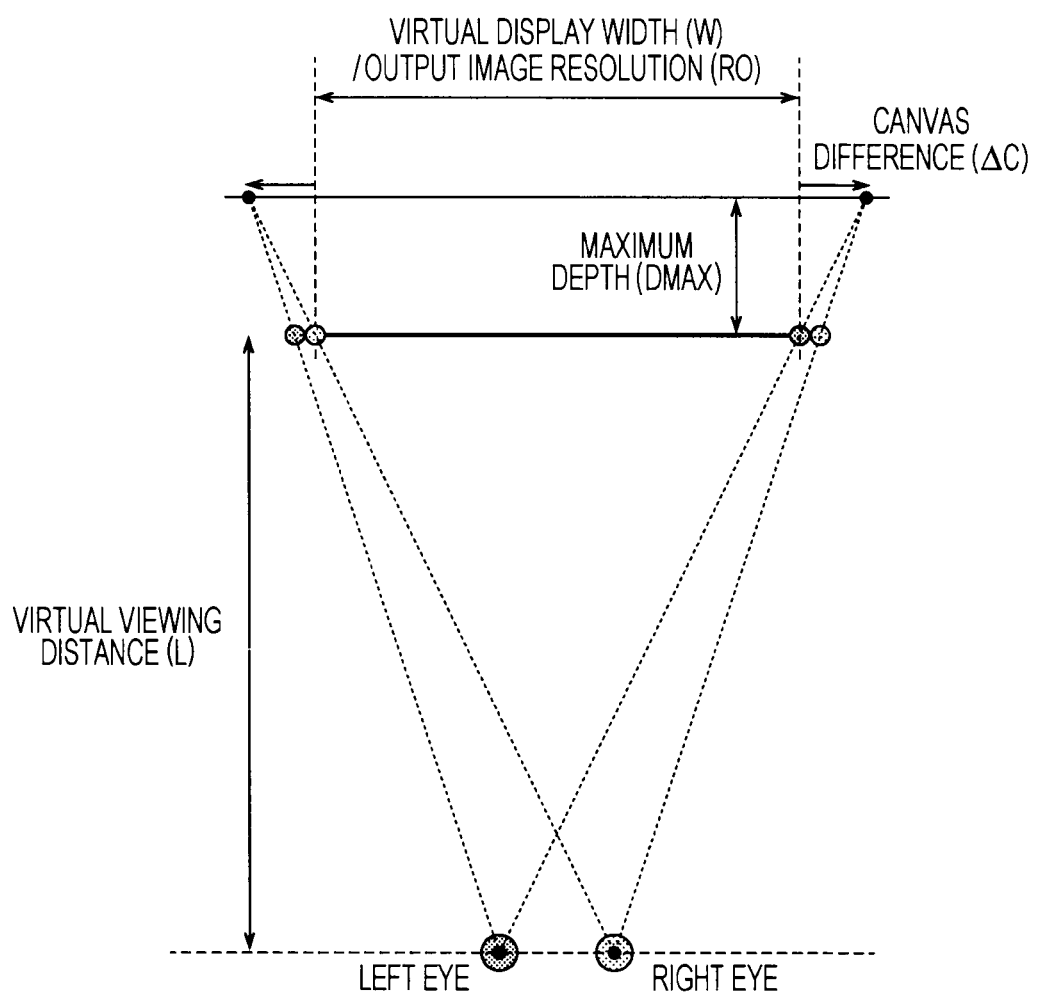
FIG. 10 illustrates a state in which the canvas resolution used for creating an image is set to be greater than the resolution of a 3D image.

As another example, the canvas resolution used when creating an image may be set to be greater than the resolution of a 3D image, which is a final output. FIG. 10 schematically illustrates the layers and the display surface as viewed from the top when the canvas resolution is set to be greater than the resolution of the 3D image.

In FIG. 10, the canvas difference ΔC is the amount of difference by which the canvas resolution is greater than the resolution of a 3D image, which is a final output. The canvas difference ΔC can be calculated with use of the virtual viewing distance L, the maximum depth DMax from the display surface, the virtual display width W, and the resolution RO of a 3D image to be output.

The canvas resolution may be set to be the same as the output resolution, and in the process for converting a 2D image into a 3D image, the canvas resolution may be increased by an amount equal to the canvas difference ΔC, and then, the 2D image may be converted into a 3D image.

Figure 11:
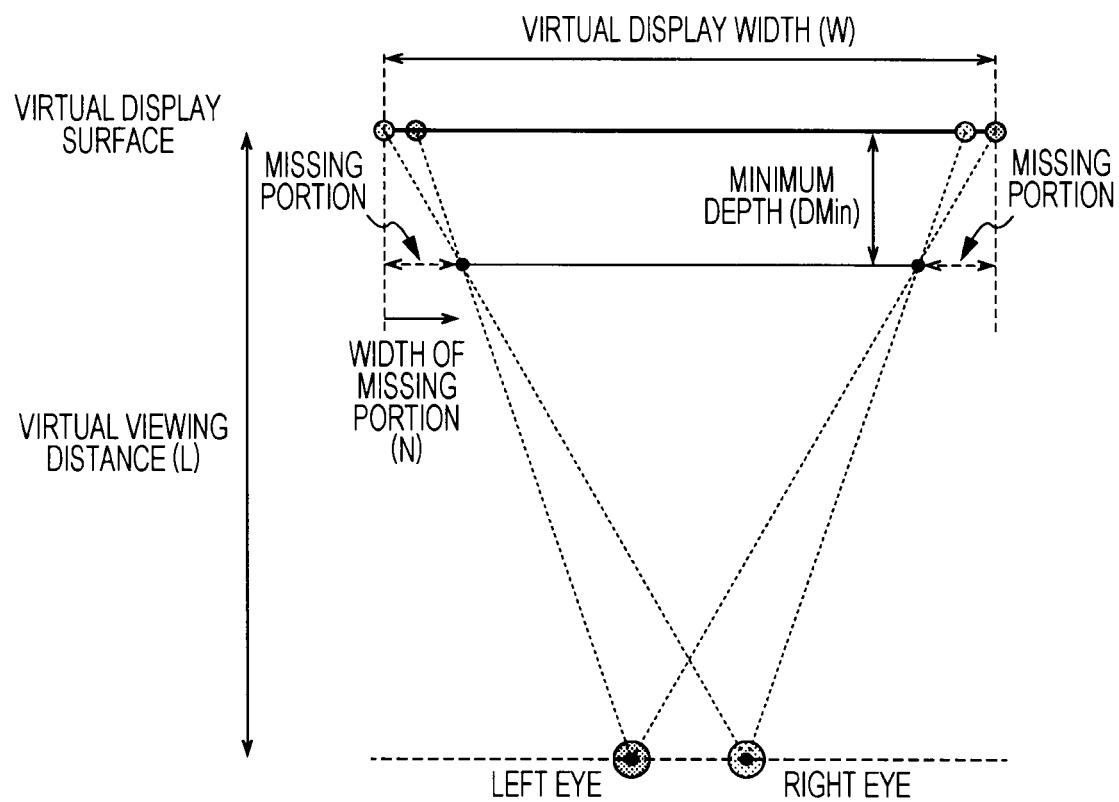
FIG. 11 illustrates a state in which missing portions are generated at the edge portions of an output image when a layer disposed farther forward than a display surface is projected on the output image.

Conversely, if the canvas resolution is set to be the same as the output resolution of the image, when a layer positioned farther forward than the display surface is projected on the output image (display surface), missing portions are generated at the edge portions of the layer. FIG. 11 schematically illustrates the layer and the display surface as viewed from the top in such a state. The missing portion width N can be calculated with use of the virtual display width W, the virtual viewing distance L, the minimum depth DMin, etc.

Figure 12:
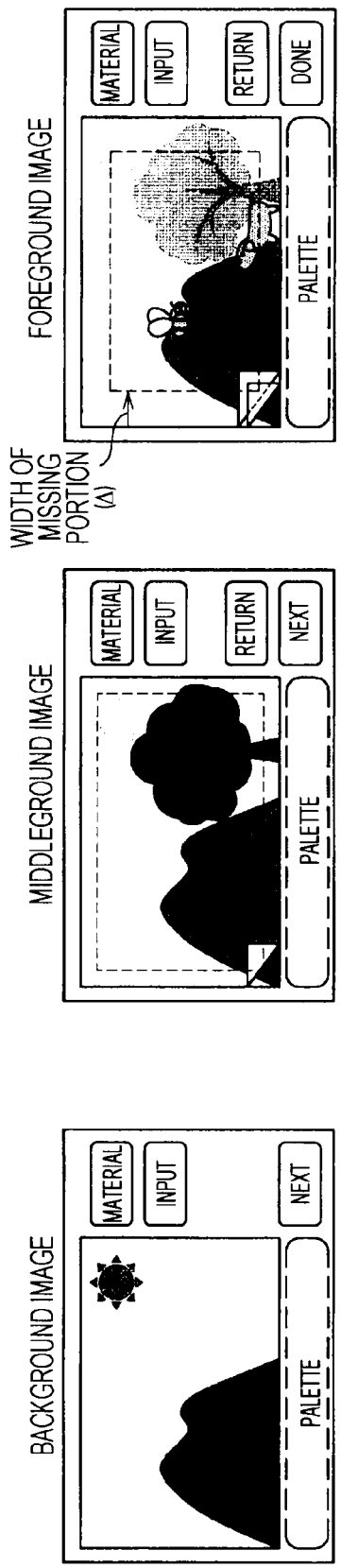
FIG. 12 illustrates a state in which missing portions are displayed on an image creating screen.

If missing portions are generated at the edge portions of each layer, when creating an image (when displaying a image creating screen), an image may be displayed so as to let the user recognize missing portions. FIG. 12 illustrates the state in which missing portions Δ are displayed on the image creating screen. This enables the user to recognize that missing portions are to be generated in the resulting 3D image when converting a 2D image into a 3D image.

The problems occurring when a regular 2D image is converted into a 3D image and solutions to such problems have been discussed above.

Figure 13:
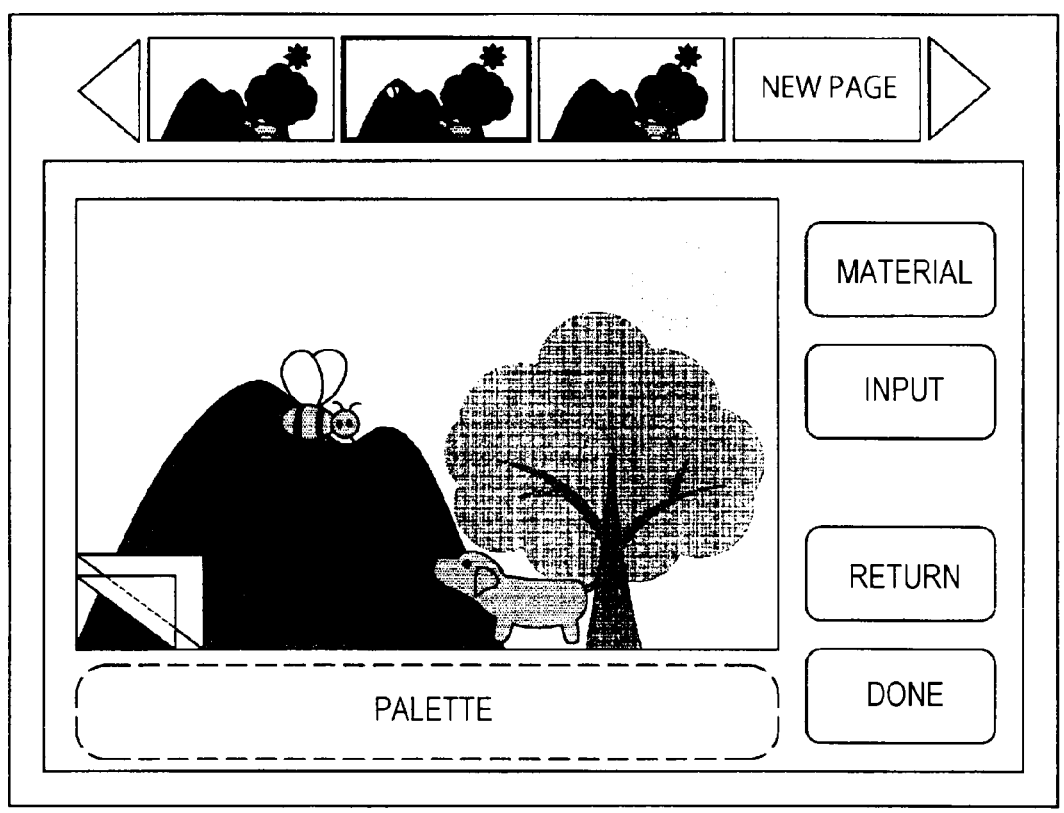
FIG. 13 illustrates an example of a screen for producing a picture book including a plurality of 3D images.

As described above, the image processing apparatus 100 according to an embodiment of the present disclosure enables a user to generate 3D images easily. The image processing apparatus 100 according to an embodiment of the present disclosure may also enable a user to produce a picture book including a plurality of 3D images. FIG. 13 illustrates an example of a screen for producing a picture book including a plurality of 3D images. When producing a picture book including a plurality of 3D images, as shown in FIG. 13, a page browser for displaying created images as thumbnail images is shown at the top of the screen so as to allow the user to check the images forming a picture book.

The picture book produced by the user as described above can be stored in the image storage unit 120. In this case, the picture book may be stored in the image storage unit 120 in various data formats. For example, each page or each layer may be stored as an independent image so that it can be re-edited. Alternatively, the picture book may be stored in a data format (e.g., JPEG) such that all layers of each page may be stored as one image. The picture book may be stored in a multi-picture object file (MPO) format. Alternatively, a movie file may be formed from a plurality of 3D images and may be stored as a 3D movie.

A description will now be given, with reference to FIG. 14, of a technique for moving an object contained in an image drawn by a user by use of the image processing apparatus 100 according to an embodiment of the present disclosure.

FIG. 14 illustrates a state in which an object selected by a user (for example, by clicking the object with a mouse or touching the object with a finger) is moved by making the boundary of the object transparent. More specifically, in FIG. 14, the image of a bee is selected and moved. After moving the image of the object, the portion where the object was present is made transparent, and the moved object is updated. Accordingly, in the example shown in FIG. 14, the portion where the image of the bee was present is made transparent, and the image of the dog is overwritten by the image of the bee.

FIG. 15 illustrates a technique for moving an object contained in an image drawn by a user by use of the image processing apparatus 100 according to an embodiment of the present disclosure.

In the example shown in FIG. 15, the user selects a moving range (for example, by clicking the moving range with a mouse or touching it with a finger) so as to move the entirety of the moving range. More specifically, a rectangular region including the image of the bee is selected and moved. After moving the object, the portion where the object was present is made transparent, and the moving object is updated. Accordingly, in the example shown in FIG. 15, the rectangular region where the image of the bee was present is made transparent, and the rectangular region including the image of the dog is overwritten by the rectangular region including the image of the bee.

In the image processing apparatus 100, the user can move an object contained in an image drawn by the user. A technique for moving an object is not restricted to that described above. In FIG. 15, the selection range is a rectangular shape. However, the shape of the selection range may be selected as desired, for example, it may be a circular shape.

The technique for moving an object contained in an image drawn by the user with use of the image processing apparatus 100 has been discussed above. A description will now be given of examples of user interfaces for adjusting the depths of layers when converting a 2D image into a 3D image.

1-4. Examples of Interfaces for Adjusting Depths

Figure 16:
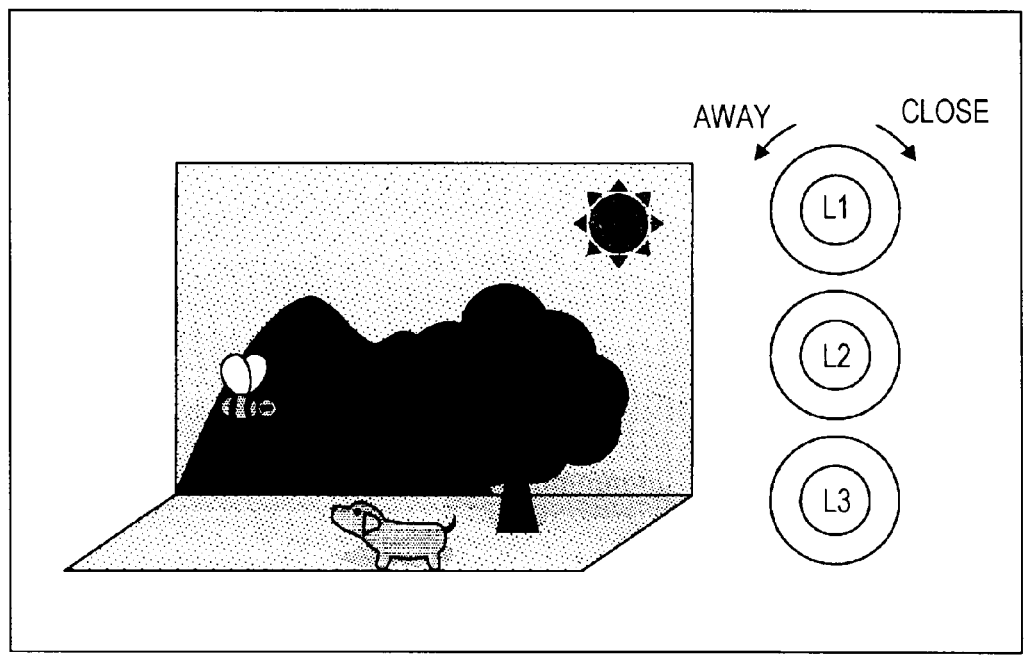
FIGS. 16 through 20 illustrate examples of user interfaces for adjusting the depths of layers.

FIG. 16 illustrates an example of a user interface for adjusting the depths of layers which is displayed on the image display unit 140 by the image processing apparatus 100. In FIG. 16, images of wheels are shown on the image display unit 140 so as to adjust the depths of the layers.

The user operates the wheels corresponding to the individual layers displayed on the image display unit 140 with a mouse or touches the wheels with a finger if a touch panel is provided, thereby changing the depths of the individual layers. With this operation, the user may enjoy operating the system and may easily perform fine adjustment of the depths of layers. Additionally, with this operation, the depths of layers do not change rapidly, and thus, a change in the appearance of 3D images is not drastic, thereby preventing the user from being confused.

Figure 17:
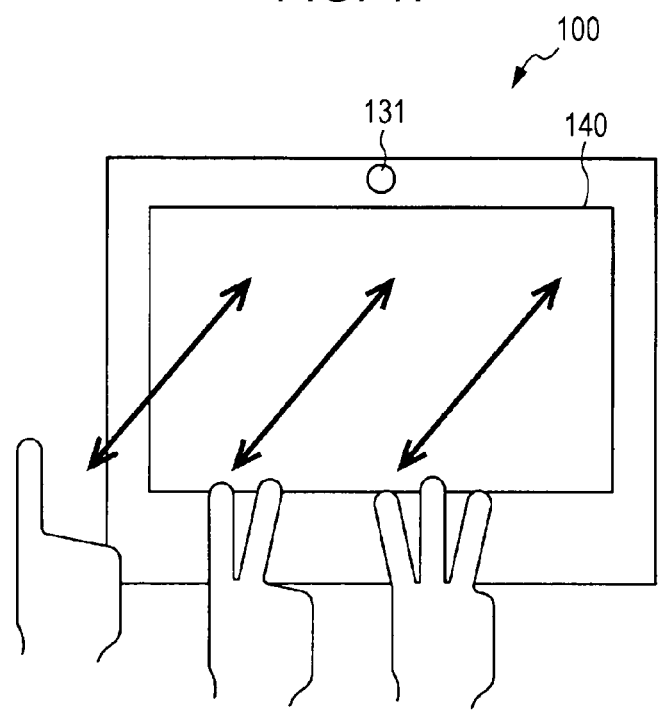

FIG. 17 illustrates an example of a user interface for adjusting the depths of layers which is displayed on the image display unit 140 by the image processing apparatus 100. In FIG. 17, the user adjusts the depths of the layers by using gestures.

If, for example, the image processing apparatus 100 is provided with a small imaging device 131, the user may specify a layer using the appropriate number of fingers while facing the imaging device 131 and move their fingers back and forth in front of the imaging device 131, thereby adjusting the depth of the corresponding layer.

The number of fingers specified by the user and a change in the position of the fingers may be detected by the 3D image converter 114. Accordingly, the 3D image converter 114 can adjust the depth of the corresponding layer. With this operation, the user may enjoy operating the system. The user is also protected from eye strain since the user performs an operation while being far from the screen. Also, when displaying a preview of a 3D image, it is not necessary to display a user interface for adjusting the layers of the depths on the screen, thereby making it possible to display the 3D image on the full screen. Gestures for specifying a layer or the depth of a layer are not restricted to those described above.

Figure 18:
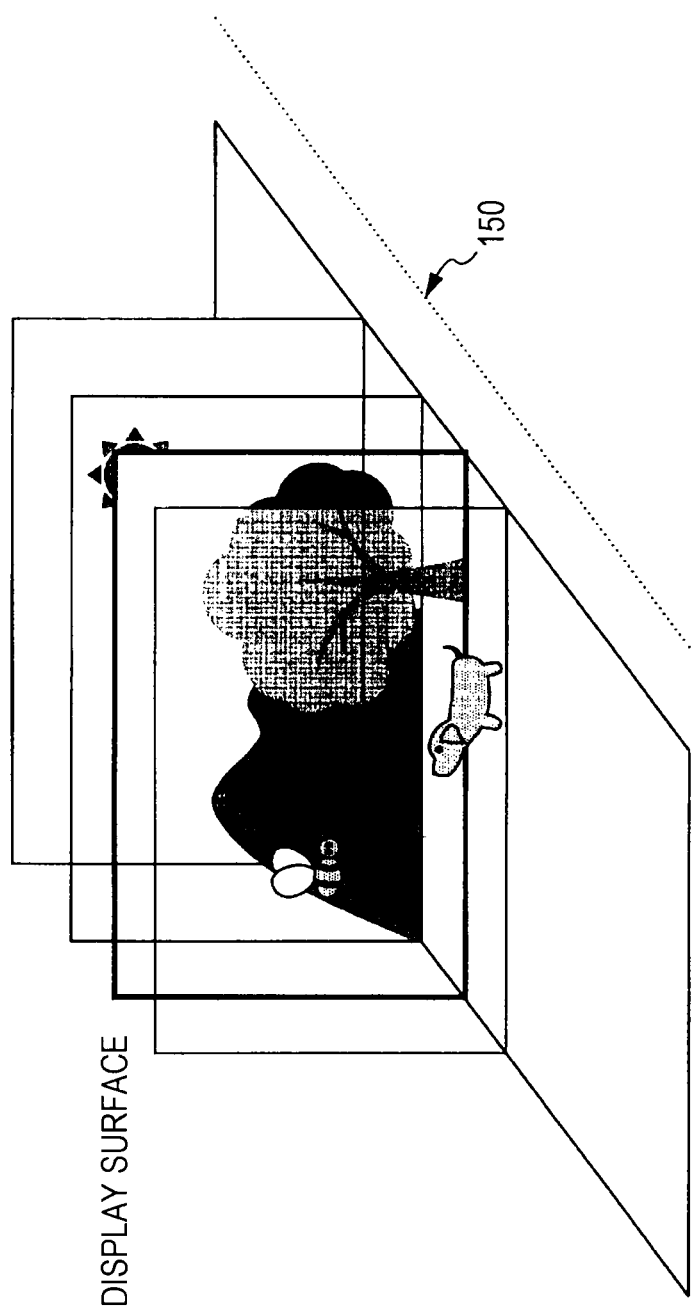

FIG. 18 illustrates an example of a user interface for adjusting the depths of layers displayed on the image display unit 140 by the image processing apparatus 100. In FIG. 18, for easy understanding of the positional relationships among a plurality of layers, the layers are displayed in the oblique upward direction so as to adjust the depths of the layers. In FIG. 18, a scale 150 is also displayed to make the user easily understand the position of each layer. For the sake of representation, in FIG. 18, a preview of a 3D image is not shown. It is desirable, however, that a preview of a 3D image be displayed together with a user interface, such as that shown in FIG. 18.

In this manner, in order to make the user easily understand the positional relationships among the layers, they are displayed in the oblique upward direction so as to allow the user to operate the user interface shown in FIG. 18. It is thus possible for the user to easily adjust the appearance of a 3D image when displaying a preview of the 3D image.

In the user interface shown in FIG. 18, the user may adjust the depths of the layers by directly operating the individual layers shown in FIG. 18. Alternatively, the user interface may be combined with the above-described slider bar, wheels, and gestures, and the result of adjustment may be provided to the user as feedback of operations performed on those user interfaces.

Figure 19:
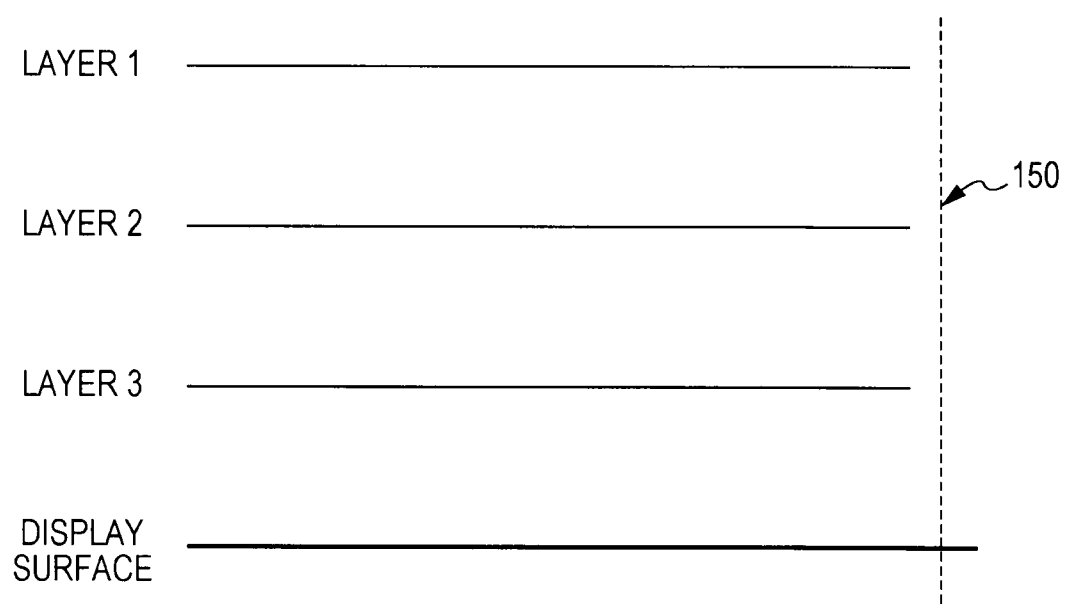

FIG. 19 illustrates an example of a user interface for adjusting the depths of layers which is displayed on the image display unit 140 by the image processing apparatus 100. In FIG. 19, in order to make the user easily understand the positional relationships among the layers, the layers are displayed from the top so as to allow the user to adjust the depths of the layers. In FIG. 19, in order to make the user easily understand the position of each layer, the scale 150 is also shown. In FIG. 19, for the sake of representation, a preview of a 3D image is not shown. It is desirable, however, that a preview of a 3D image be displayed together with a user interface, such as that shown in FIG. 19.

In this manner, in order to make the user easily understand the positional relationships among the layers, the layers are displayed from the top so as to allow the user to operate the user interface shown in FIG. 19. It is thus possible for the user to easily adjust the appearance of a 3D image when displaying a preview of the 3D image.

In the user interface shown in FIG. 19, the user may adjust the depths of the layers by directly operating the individual layers shown in FIG. 19. Alternatively, the user interface may be combined with the above-described slider bar, wheels, and gestures, and the result of adjustment may be provided to the user as feedback of operations performed on those user interfaces.

Figure 20:
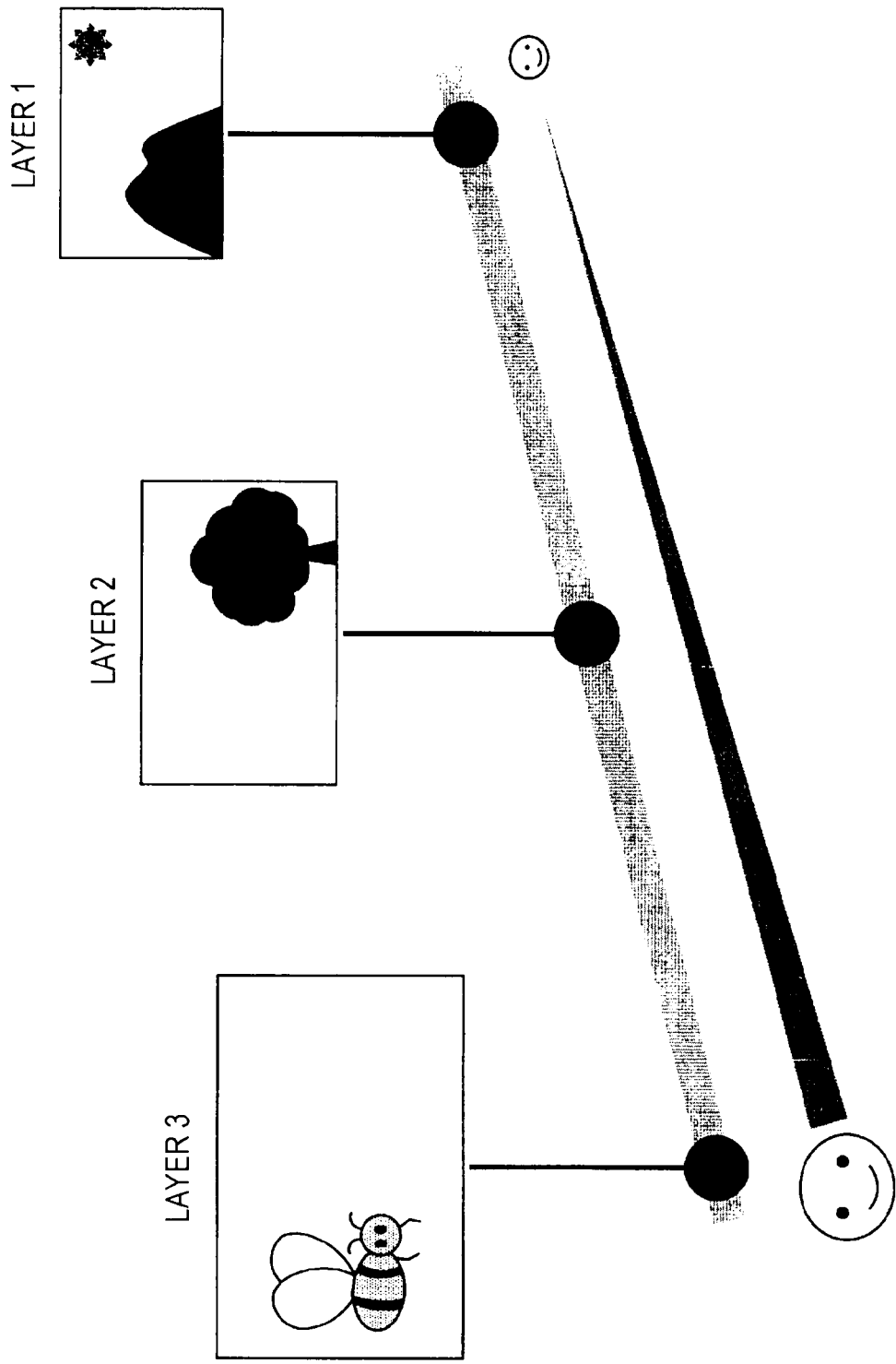

FIG. 20 illustrates an example of a user interface for adjusting the depths of layers which is displayed on the image display unit 140 by the image processing apparatus 100. In FIG. 20, in order to make the user easily understand the positional relationships among the layers, a slider bar and thumbnails are displayed together so as to adjust the depths of the layers. In FIG. 20, for the sake of representation, a preview of a 3D image is not shown. It is desirable, however, that a preview of a 3D image be displayed together with a user interface, such as that shown in FIG. 20.

In this manner, in order to make the user easily understand the positional relationships among the layers, the slider bar and thumbnails are displayed together so as to allow the user to operate the user interface shown in FIG. 20. It is thus possible for the user to easily adjust the appearance of a 3D image when displaying a preview of the 3D image.

In the user interface shown in FIG. 20, the user may adjust the depths of the layers by directly operating the individual layers shown in FIG. 20. Alternatively, the user interface may be combined with the above-described slider bar, wheels, and gestures, and the result of adjustment may be provided to the user as feedback of operations performed on those user interfaces.

In the image processing apparatus 100, adjustment of the depths of layers may be performed when the user previews a 3D image or when the user creates a 2D image. If adjustment of the depths of layers is performed when creating a 2D image, one of the user interfaces for adjusting the depths of layers shown in FIGS. 16 through 20 may desirably be displayed on a screen for creating 2D images.

1-5. Examples of Setting of Ground in 3D Image

A description will now be given, with reference to FIG. 21, of an example in which a ground is set in a 3D image created by use of the image processing apparatus 100 according to an embodiment of the present disclosure.

Figure 21:
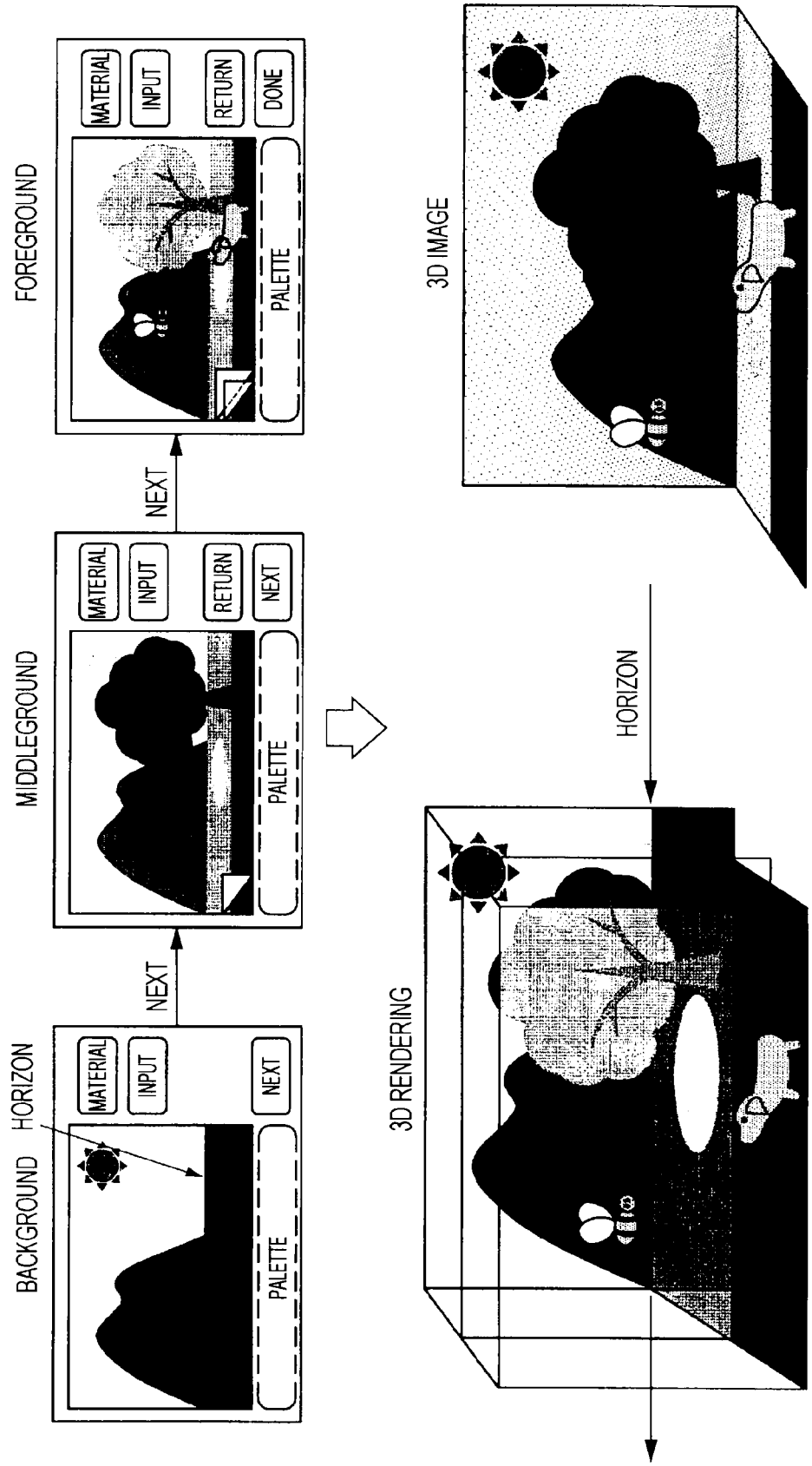
FIG. 21 illustrates an example in which a ground is set in a 3D image created by use of the image processing apparatus according to an embodiment of the present disclosure.

In FIG. 21, a horizon is set in a background image, and the portion below the horizon represents a ground. The ground portion below the horizon is converted into a 3D image as a layer projected in the depth direction toward the surface having a depth 0, i.e., on the display surface. That is, the portion below the horizon which is set in the background image is converted into a 3D image as a ground layer extending in the depth direction farther forward than the layer in which the horizon is set. As a result, in the image processing apparatus 100 according to an embodiment of the present disclosure, if a horizon is set in a background image, a 3D image, such as that shown in FIG. 21, can be created. The horizon may be preset in a template for background images or may be set as desired when the user draws layers.

Figure 22:
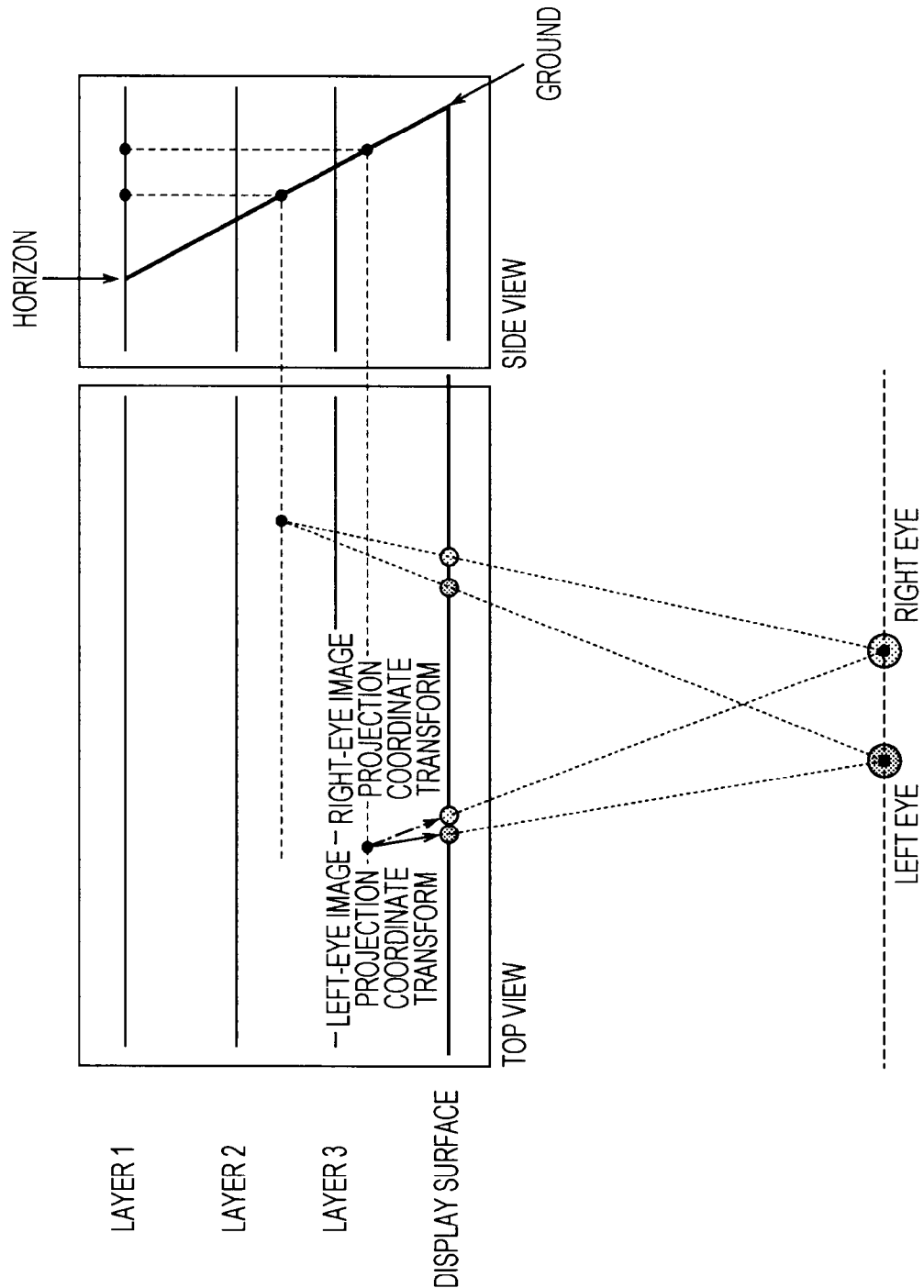
FIG. 22 illustrates an example of conversion from a ground portion into a 3D image.

FIG. 22 illustrates an example of conversion from a horizon and a ground portion into a 3D image. For representing such conversion, FIG. 22 illustrates the positional relationships among the layers as viewed from the top and from the side. In the side view, the left side is the top of the screen, while the right side is the bottom of the screen.

Hereinafter, the layer in which the horizon is set is referred to as a far end layer, and the layer including the foremost portion of the ground is referred to as a near end layer. The ground layer is defined as a layer having, as four vertexes, both corners of the horizon on the far end layer and both corners of the bottom of the near end layer. The near end layer is the display layer or a rendering layer positioned farther forward than the far end layer. The near end layer may be selected by the user, or may be fixed as, for example, the display surface. In most cases, as shown in FIGS. 21 and 22, the horizon is set in the most backward layer in which a background is rendered, and the display surface serves as the near end layer.

As shown in FIG. 22, in order to convert the horizon and the ground portion of the 2D image of the background (layer 1) into a 3D image, the 3D image converter 114 first projects the pixels of the image of the horizon and the ground portion onto the line connecting the horizon of the background and the bottommost portion of the display surface, and then, projection coordinate transform for a right-eye image and projection coordinate transform for a left-eye image are performed on the projected points. The projection coordinate transform for the right-eye image and the projection coordinate transform for the left-eye image on the display surface are performed in a manner similar to the above-described projection coordinate transform.

The 3D image converter 114 performs coordinate transform as described above, and thus, the ground portion can also be displayed three-dimensionally in a 3D image, thereby allowing the user to more easily create 3D images. If the depth of the layer in which the horizon is set is adjusted, the definition of the ground layer is recalculated in real time in accordance with the adjustment of the depth of the layer.

2. Hardware Configuration

Figure 23:
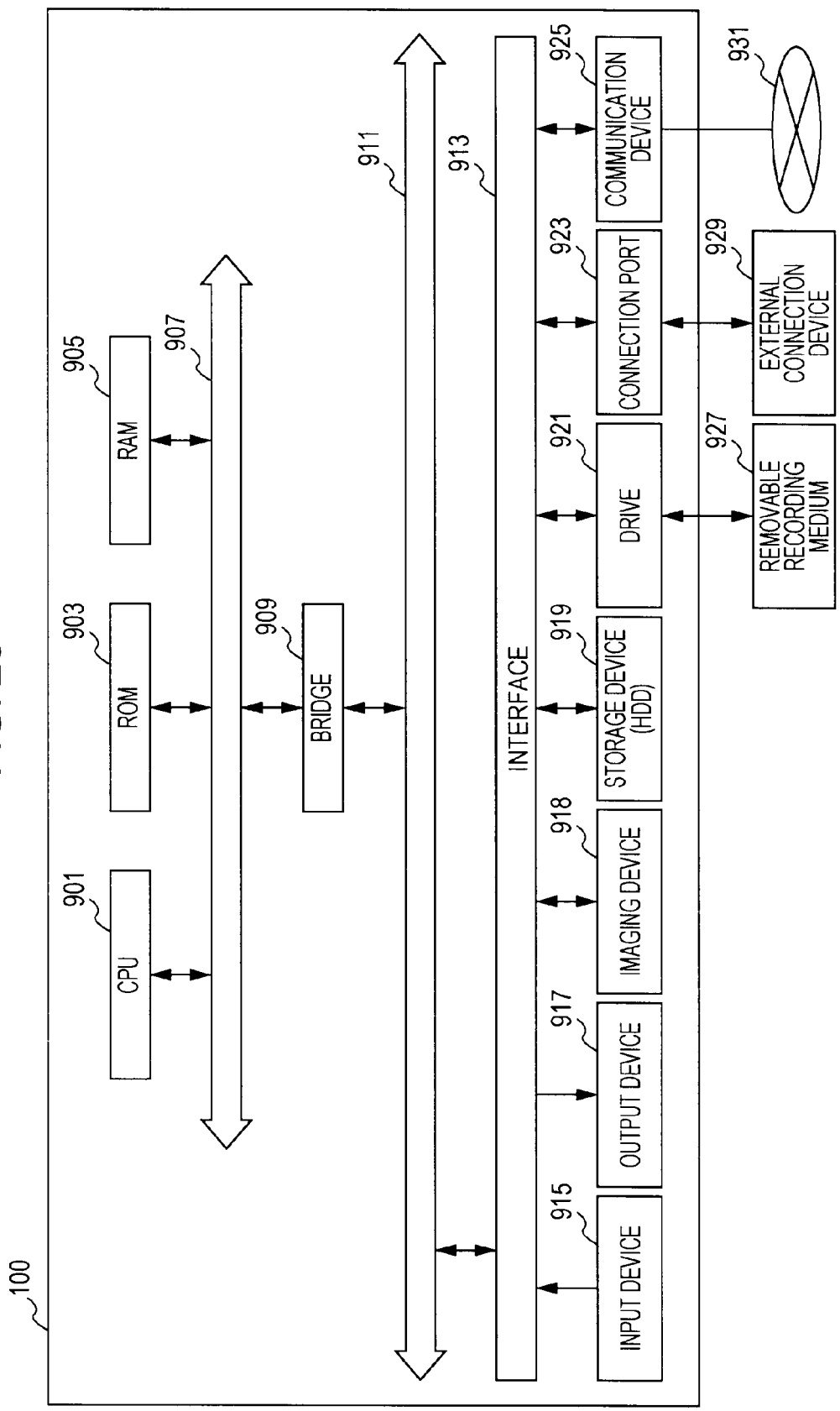
FIG. 23 illustrates an example of a hardware configuration of the image processing apparatus according to an embodiment of the present disclosure.

An example of the hardware configuration of the image processing apparatus 100 according to an embodiment of the present disclosure will be described below in detail with reference to the block diagram FIG. 23.

The image processing apparatus 100 includes, as major parts, a central processing unit (CPU) 901, a read only memory (ROM) 903, a random access memory (RAM) 905, a host bus 907, a bridge 909, an external bus 911, an interface 913, an input device 915, an output device 917, an imaging device 918, a storage device 919, a drive 921, a connection port 923, and a communication device 925.

The CPU 901 serves as a processor and a controller, and controls the entirety or part of the operation within the image processing apparatus 100 in accordance with various programs stored in the ROM 903, the RAM 905, the storage device 919, or a removable recording medium 927. In the ROM 903, programs, control parameters, etc., used by the CPU 901 are stored. In the RAM 905, which is a primary storage device, programs used while the CPU 901 is executed and parameters that are appropriately changed while the CPU 901 is executed are stored. The CPU 901, the ROM 903, and the RAM 905 are connected to each other via the host bus 907, which is formed of an internal bus, such as a CPU bus.

The host bus 907 is connected to the external bus 911, such as a peripheral component interconnect/interface (PCI) bus, via the bridge 909.

The input device 915 is an operation unit including a mouse, a keyboard, a touch panel, buttons, switches, levers, etc. that are operated by a user. The input device 915 may be a remote controller using infrared or another type of radio waves, or an external connection device 929, such as a cellular telephone or a personal digital assistant (PDA), corresponding to the operation of the image processing apparatus 100. The input device 915 may include an input control circuit that generates an input signal on the basis of information input by a user with use of the above-described operation unit and that outputs the input signal to the CPU 901. The user of the image processing apparatus 100 operates the input device 915 so as to input various items of data into the image processing apparatus 100 or to instruct the image processing apparatus 100 to perform processing operations.

The output device 917 includes display units, such as a cathode ray tube (CRT) display, a liquid crystal display, a plasma display, an electroluminescence (EL) display, and a lamp, sound output units, such as a speaker and a headphone, and devices that can visually or acoustically notify users of obtained information, such as a printer, a cellular telephone, and a fax machine. The output device 917 may output results obtained by performing various types of processing by use of the image processing apparatus 100. More specifically, the display unit displays, in text or images, results obtained by performing various types of processing by use of the image processing apparatus 100. The sound output units convert an audio signal, such as reproduced sound data or acoustic data, into an analog signal and output it.

The imaging device 918 is provided, for example, on the upper portion of the display device, so as to capture still images or moving pictures taken by the user of the image processing apparatus 100. The imaging device 918, which includes a charge coupled device (CCD) image sensor or a complementary metal oxide semiconductor (CMOS) image sensor, converts light condensed with a lens into an electric signal so as to capture still images or moving pictures.

The storage device 919 is a data storage device which is formed as part of the storage unit of the image processing apparatus 100, and includes a magnetic storage device, such as a hard disk drive (HDD), a semiconductor storage device, an optical storage device, or a magneto-optical storage device. The storage device 919 stores programs and various data executed by the CPU 901 and acoustic signal data and image signal data obtained from external sources.

The drive 921 is a recording medium reader/writer, and is contained in the image processing apparatus 100 or is attached to the image processing apparatus 100 as an external drive. The drive 921 reads out information recorded on a removable recording medium 927, such as a magnetic disk, an optical disc, a magneto-optical disk, or a semiconductor memory, which is set on the drive 921, and outputs the read information to the RAM 905. The drive 921 also writes information into the removable recording medium 927, such as a magnetic disk, an optical disc, a magneto-optical disk, or a semiconductor memory, which is set on the drive 921. The removable recording medium 927 may be a digital versatile disc (DVD), a Blu-ray medium, a compact flash (CompactFlash CF) (registered), a memory stick, or a secure digital (SD) memory card. The removable recording medium 927 may be an integrated circuit (IC) card having a non-contact integrated circuit (IC) chip mounted thereon or an electronic device.

The connection port 923 is a port for directly connecting devices to the image processing apparatus 100. The connection port 923 may be a universal serial bus (USB) port, an IEEE1394 port, e.g., an i.Link port, a small computer system interface (SCSI) port, a recommended standard (RS)-232C port, an audio optical terminal, or a high-definition multimedia interface (HDMI) port. The external connection device 929 is connected to the connection port 923 so that the image processing apparatus 100 directly obtains or provides acoustic signal data and image signal data from or to the external connection device 929.

The communication device 925 is a communication interface through which the image processing apparatus 100 communicates with a communication network 931. The communication device 925 includes a communication card for a wired or wireless local area network (LAN), Bluetooth, or a wireless USB (WUSB), an optical communication router, asymmetric digital subscriber line (ADSL) router, or various communication modems. The communication device 925 is configured to send and receive signals to and from the Internet and other communication devices in accordance with predetermined protocols, such as Transmission Control Protocol/Internet Protocol (TCP/IP). The communication network 931 to be connected to the communication device 925 is a wired or wireless network, such as the Internet, a home LAN, infrared communication, radio communication, or satellite communication.

An example of the hardware configuration which can implement the functions of the image processing apparatus 100 according to an embodiment of the present disclosure has been discussed. The above-described components may be formed by general-purpose members or hardware specially used for the functions of the above-described components. Thus, the hardware configuration may be changed appropriately according to the technical level available when an embodiment of the present disclosure is carried out.

3. Summary

As described above, by use of the image processing apparatus 100 according to an embodiment of the present disclosure, a 2D image including a plurality of layers created by a user can be converted into a 3D image. When converting from a 2D image into a 3D image, the image processing apparatus 100 performs coordinate transform by using information concerning the depths of the layers so as to create a right-eye image and a left-eye image. With this operation of the image processing apparatus 100, the user is able to easily create 3D images without the need for complicated calculations or processing.

Additionally, by use of the image processing apparatus 100 according to an embodiment of the present disclosure, the user is able to adjust the depths of layers when previewing a 3D image. Then, on the basis of the adjustment of the depths of the layers, the image processing apparatus 100 performs 3D conversion in real time. With this operation, the image processing apparatus 100 is able to adjust the appearance of 3D images in real time.

The above-described image processing may be executed by a computer program stored in the image processing apparatus 100. In this case, a CPU provided within the image processing apparatus 100 or another controller may read the computer program and sequentially execute the program operations so as to cause the computer program to execute the image processing.

While the preferred embodiments of the present disclosure have been discussed in detail with reference to the accompanying drawings, the present disclosure is not restricted to the foregoing embodiments. It is apparent that those who have common knowledge of the technical field of the present disclosure will attain various modifications, combinations, sub-combinations and alterations depending on design requirements and other factors insofar as they are within the scope of the appended claims or the equivalents thereof. It is to be understood that those modifications, combinations, sub-combinations and alterations are included in the scope of the present disclosure.

For example, in the above-described embodiments, the image creating unit 112 is included in the image creating processor 110 of the image processing apparatus 100, and the image creating processor 110 creates 2D images for a user and converts the 2D images to 3D images. However, the present disclosure is not restricted to this configuration. For example, an image including a plurality of layers may be created in another device, or may be obtained by, for example, downloading the created image via the Internet. Then, the image processing apparatus 100 may convert the obtained image into a 3D image. In this case, virtual distances among the layers of a 2D image may be preset in the image processing apparatus 100, and the image processing apparatus 100 may convert the 2D image into a 3D image on the basis of the virtual distances.

The present disclosure contains subject matter related to that disclosed in Japanese Priority Patent Application JP 2010-219867 filed in the Japan Patent Office on Sep. 29, 2010, the entire contents of which are hereby incorporated by reference.

What is claimed is:

1. An image processing apparatus, comprising:
one or more processors operable to:
   determine a change in at least one of a plurality of virtual distances between corresponding planes of a plurality of planes of a two-dimensional image;
   convert the two-dimensional image into a three-dimensional image based on the determination,
      wherein a ground portion of the two-dimensional image is converted into a ground layer in the three-dimensional image based on a horizon set in at least one of the plurality of planes of the two-dimensional image;
   display the three-dimensional image on a display surface;
   update the ground layer in the displayed three-dimensional image based on a change in a depth of the at least one of the plurality of planes of the two-dimensional image where the horizon is set;
   project pixels of the horizon set in the at least one of the plurality of planes of the two-dimensional image and the ground portion of the two-dimensional image on a line that connects the horizon and a bottom most portion of the display surface;
   generate coordinate transform for left-eye and right-eye images on the projected pixels; and
   convert the horizon and the ground portion of the two-dimensional image into a 3-D horizon and the ground layer, respectively in the three-dimensional image based on the generated coordinate transform.

2. The image processing apparatus according to claim 1, wherein the one or more processors are operable to convert the two-dimensional image so that edge portions of the two-dimensional image are present in the three-dimensional image.

3. The image processing apparatus according to claim 1, wherein the one or more processors are operable to change the at least one of the plurality of virtual distances between the corresponding planes based on a slider bar.

4. The image processing apparatus according to claim 1, wherein the one or more processor are operable to change the at least one of the plurality of virtual distances between the corresponding planes of the two-dimensional image based on wheels displayed on the display surface in association with the corresponding planes of the two-dimensional image.

5. The image processing apparatus according to claim 1, wherein the one or more processors are further operable to:
   cause capture of an image;
   detect a gesture by a user; and
   change the at least one of the plurality of virtual distances between the corresponding planes of the plurality of planes of the two-dimensional image based on the gesture.

6. The image processing apparatus according to claim 5, wherein the gesture detected by the one or more processors specifies a plane of the plurality of planes of the two-dimensional image with a number of fingers via the gesture,
wherein the one or more processors are further operable to change the at least one of the plurality of virtual distances between the corresponding planes of the plurality of planes of the two-dimensional image with a back-and-forth movement of the number of fingers.

7. The image processing apparatus according to claim 1, wherein the one or more processors are further operable to:
   generate the coordinate transform based on a viewer inter-eye distance, a virtual viewing distance, and the plurality of virtual distances among the plurality of planes, and
   update the coordinate transform based on the determination of the change in the at least one of the plurality of virtual distances between the corresponding planes.

8. The image processing apparatus according to claim 1, wherein the one or more processors are further operable to adjust appearance of the three-dimensional image based on input from a slider bar.

9. The image processing apparatus according to claim 1, wherein a canvas resolution while creation of the three-dimensional image is same as output resolution of the three-dimensional image.

10. The image processing apparatus according to claim 1, wherein the one or more processors are operable to change the at least one of the plurality of virtual distances between the corresponding planes with respect to a mark that indicates a position of the display surface as a reference.

11. The image processing apparatus according to claim 1, wherein spaces generated at edge portions of the three-dimensional image during the conversion are filled with a background color.

12. An image processing method, comprising:
   determining a change in at least one of a plurality of virtual distances between corresponding planes of a plurality of planes of a two-dimensional image;
   converting the two-dimensional image into a three-dimensional image based on the determination,
      wherein a ground portion of the two-dimensional image is converted into a ground layer in the three-dimensional image based on a horizon set in at least one of the plurality of planes of the two-dimensional image;
   displaying the three-dimensional image on a display surface;
   updating the ground layer in the displayed three-dimensional image based on a change in a depth of the at least one of the plurality of planes of the two-dimensional image where the horizon is set;
   projecting pixels of the horizon set in the at least one of the plurality of planes of the two-dimensional image and the ground portion of the two-dimensional image on a line that connects the horizon and a bottom most portion of the display surface;
   generating coordinate transform for left-eye and right-eye images on the projected pixels; and
   converting the horizon and the ground portion of the two-dimensional image into a 3-D horizon and the ground layer, respectively in the three-dimensional image based on the generated coordinate transform.

13. The image processing method according to claim 12, further comprising
   generating the coordinate transform based on a viewer inter-eye distance, a virtual viewing distance, and the plurality of virtual distances among the plurality of planes, and
   updating the coordinate transform based on the determination of the change in the at least one of the plurality of virtual distances between the corresponding planes.

14. The image processing method according to claim 12, further comprising adjusting appearance of the three-dimensional image based on input from a slider bar.

15. A non-transitory computer-readable medium having stored thereon, computer-executable instructions that, when executed by a processor, causes a computer to execute operations, the operations comprising:
  determining a change in at least one of a plurality of virtual distances between corresponding planes of a plurality of planes of a two-dimensional image;
  converting the two-dimensional image into a three-dimensional image based on the determination,
    wherein a ground portion of the two-dimensional image is converted into a ground layer in the three-dimensional image based on a horizon set in at least one of the plurality of planes of the two-dimensional image;
  displaying the three-dimensional image on a display surface; and
  updating the ground layer in the displayed three-dimensional image based on a change in a depth of the at least one of the plurality of planes of the two-dimensional image where the horizon is set;
  projecting pixels of the horizon set in the at least one of the plurality of planes of the two-dimensional image and the ground portion of the two-dimensional image on a line that connects the horizon and a bottom most portion of the display surface;
  generating coordinate transform for left-eye and right-eye images on the projected pixels; and
  converting the horizon and the ground portion of the two-dimensional image into a 3-D horizon and the ground layer, respectively in the three-dimensional image based on the generated coordinate transform.

16. The non-transitory computer-readable medium according to claim 15, comprising
  generating the coordinate transform based on a viewer inter-eye distance, a virtual viewing distance, and the plurality of virtual distances among the plurality of planes, and
  updating the coordinate transform based on determination of the change in the at least one of the plurality of virtual distances between the corresponding planes.

* * * * *